United States Patent
Skowronek

(10) Patent No.: US 10,803,515 B2
(45) Date of Patent: Oct. 13, 2020

(54) SYSTEMS, METHODS, AND APPARATUS FOR USING A CONTACTLESS TRANSACTION DEVICE READER WITH A COMPUTING SYSTEM

(75) Inventor: Daniel P Skowronek, Parker, CO (US)

(73) Assignee: First Data Corporation, Atlanta, GA (US)

( * ) Notice: Subject to any disclaimer, the term of this patent is extended or adjusted under 35 U.S.C. 154(b) by 1060 days.

(21) Appl. No.: 12/262,400

(22) Filed: Oct. 31, 2008

(65) Prior Publication Data

US 2010/0114773 A1    May 6, 2010

(51) Int. Cl.
- *G06Q 40/00* (2012.01)
- *G06Q 40/02* (2012.01)
- *G06Q 20/40* (2012.01)

(52) U.S. Cl.
CPC ............. *G06Q 40/02* (2013.01); *G06Q 20/40* (2013.01); *G06Q 40/00* (2013.01)

(58) Field of Classification Search
CPC ..................................................... G06Q 40/00
USPC .......................................................... 705/35
See application file for complete search history.

(56) References Cited

U.S. PATENT DOCUMENTS

| 5,777,305 | A | 7/1998 | Smith |
| 6,045,043 | A | 4/2000 | Bashan |
| 6,161,762 | A | 12/2000 | Bashan |
| 6,505,772 | B1 | 1/2003 | Mollett |
| 6,719,206 | B1 | 4/2004 | Bashan |
| 6,994,762 | B2 | 2/2006 | Clingman |

(Continued)

FOREIGN PATENT DOCUMENTS

| GB | 2 396 530 | 12/2002 |
| JP | 2002373324 | 12/2002 |

(Continued)

OTHER PUBLICATIONS

Wave the Charges Author: Larson, Jane Publication info: Arizona Republic [Phoenix, Ariz] Jun. 1, 2005: D.1. (Year: 2005).*

(Continued)

*Primary Examiner* — Bruce I Ebersman
*Assistant Examiner* — John A Anderson
(74) *Attorney, Agent, or Firm* — Eversheds Sutherland (US) LLP

(57) ABSTRACT

Embodiments of the invention may relate to systems, methods, and apparatus for using a contactless transaction device reader with a computing system. According to one embodiment, a system for conducting a transaction on a personal computing system using a contactless transaction device may include a communications interface operable to connect with a network, a memory, a contactless transaction device reader operable to communicate wirelessly with a contactless transaction device, and a processor in communication with the memory, the communications interface, and the contactless transaction device reader. The processor may be operable to cause the contactless transaction device reader to read information from the contactless transaction device, to verify that the user's authority, to provide transaction information, based at least in part on the information read from the contactless transaction device, when conducting a transaction, and to transmit at least a portion of the transaction information to an entity.

23 Claims, 8 Drawing Sheets

(56) References Cited

U.S. PATENT DOCUMENTS

| | | |
|---|---|---|
| 7,093,767 B2 | 4/2006 | Faenza, Jr. |
| 7,042,357 B2 | 5/2006 | Girvin |
| 7,119,690 B2 | 10/2006 | Lerch |
| 7,124,937 B2 | 10/2006 | Myers |
| 7,168,626 B2 | 1/2007 | Lerch |
| 7,243,840 B2 | 7/2007 | Bashan |
| 7,264,172 B2 | 9/2007 | Amiot |
| 7,283,054 B2 | 10/2007 | Girvin |
| 7,286,055 B2 | 10/2007 | Girvin et al. |
| 7,303,120 B2 | 12/2007 | Beenau |
| 7,323,998 B2 | 1/2008 | Girvin |
| 7,360,689 B2 | 4/2008 | Beenau et al. |
| 2004/0077372 A1 | 4/2004 | Halpern |
| 2005/0024849 A1 | 2/2005 | Parker |
| 2005/0242176 A1 | 11/2005 | Roberge |
| 2005/0242177 A1 | 11/2005 | Roberge |
| 2006/0074698 A1 | 4/2006 | Bishop |
| 2006/0196929 A1 | 9/2006 | Kelley et al. |
| 2007/0156436 A1 | 7/2007 | Fisher |
| 2007/0170243 A1 | 7/2007 | DeSang |
| 2007/0267503 A1 | 11/2007 | Dewan |
| 2008/0008359 A1 | 1/2008 | Beenau et al. |
| 2008/0017704 A1 | 1/2008 | VanDeburg |
| 2008/0051059 A1 | 2/2008 | Fisher |
| 2008/0051122 A1 | 2/2008 | Fisher |
| 2008/0052192 A1 | 2/2008 | Fisher |
| 2008/0052233 A1 | 2/2008 | Fisher |
| 2009/0070272 A1* | 3/2009 | Jain ............... G06Q 20/341 705/75 |
| 2009/0108063 A1* | 4/2009 | Jain ............... G06K 7/10237 235/380 |
| 2009/0159688 A1* | 6/2009 | Mullen ........... G06K 19/06187 235/487 |
| 2009/0183008 A1 | 7/2009 | Jobmann |

FOREIGN PATENT DOCUMENTS

| | | |
|---|---|---|
| JP | 2003122911 | 4/2003 |
| WO | 2002049322 | 6/2002 |
| WO | 2004006064 | 1/2004 |
| WO | 2004006162 | 1/2004 |

OTHER PUBLICATIONS

RFID Payments: A Technologies and Process Overview, Tower Group Research Notes, Mar. 2002, pp. 1-12.

* cited by examiner

SYSTEMS, METHODS, AND APPARATUS FOR USING A CONTACTLESS TRANSACTION DEVICE READER WITH A COMPUTING SYSTEM

FIELD OF THE INVENTION

Embodiments of the invention relate generally to contactless transaction devices, and more particularly, to systems, methods, and apparatus for using a contactless transaction device reader with a computing system.

BACKGROUND OF THE INVENTION

Cashless transaction cards, such as credit cards, debit cards, ATM cards, bank cards, stored value cards, etc., are increasingly replacing other types of tender in consumer transactions. In addition, vendors and merchants are issuing different types of transaction cards, such as loyalty cards, gift cards, stored valued cards, etc., for sales promotions and the cultivation of customer loyalty. Recently there has been a movement toward contactless transaction cards and other devices that initiate and complete a transaction with a wave of a card before a radio frequency enabled or other wireless enabled terminal reader. Many gift cards, stored value cards, and loyalty card issuers, and many major credit card companies now offer contactless transaction devices, and many merchants have installed radio frequency enabled readers to facilitate such contactless electronic transactions. As a result, some of the population carries or has available contactless transaction devices.

The prevalence of personal computing and web-based transactions, such as online commerce, electronic bill payment, information gathering, etc., has also substantially increased over the years. Individuals are continuing to adopt the use of personal computers into their everyday lives, including to satisfy both personal and business needs. Moreover, consumers are increasing their use of personal computers to conduct web-based transactions.

Accordingly, a need exists for systems, methods, and apparatus for using a contactless transaction device reader with a computing system. There also exists a need for systems, methods, and apparatus that use a contactless transaction device reader with a computing system to facilitate transactions by providing information stored on or associated with a contactless transaction device. There also exists a need for systems, methods, and apparatus that use a contactless transaction device reader with a computing system to facilitate controlling access to the computing system.

SUMMARY OF THE INVENTION

Some or all of the above needs and/or problems may be addressed by certain embodiments of the invention. Embodiments of the invention may include systems, methods, and apparatus for using a contactless transaction device reader with a computing system. According to one embodiment of the invention, a system for conducting a transaction on a personal computing system using a contactless transaction device can be provided. The system may include a communications interface operable to connect with a network, a memory including instructions for conducting transactions, a contactless transaction device reader operable to communicate wirelessly with a contactless transaction device, and a processor in communication with the memory, the communications interface, and the contactless transaction device reader. The processor may be operable to execute the instructions to cause the contactless transaction device reader to read information from the contactless transaction device, to verify that the user is authorized to use the contactless transaction device, to automatically provide transaction information, based at least in part on the information read from the contactless transaction device, when conducting a transaction via the network, and to transmit at least a portion of the transaction information to an entity via the communications interface via the network.

According to another embodiment of the invention, a method for conducting a transaction using a contactless transaction device can be provided. The method may include providing a personal computing system in communication with a network and providing a contactless transaction device reader in communication with the personal computing system. The method may further include reading information from a contactless transaction device using the contactless transaction device reader, verifying, by the computing system, that the user is authorized to use the contactless transaction device. The method may also include automatically providing, by the personal computing system, at a least a portion of transaction information, based at least in part on the information read from the contactless transaction device, when conducting a transaction via the network, and transmitting at least a portion of the transaction information from the personal computing system to an entity via the network.

According to yet another embodiment of the invention, a method for controlling access to a personal computing system using a contactless transaction device can be provided. The method may include providing a computing system, and providing a contactless transaction device reader in communication with the computing system and operable to communicate with a contactless transaction device. The method may further include facilitating access to the computing system upon: reading information from the contactless transaction device using the contactless transaction device reader, receiving authorization input from a user, determining that the authorization input is associated with the information read from the contactless transaction device, and determining that the information read from the contactless transaction device is associated with the computing system.

Additional systems, methods, apparatus, features, and aspects are realized through the techniques of various embodiments of the invention. Other embodiments and aspects of the invention are described in detail herein and are considered a part of the claimed invention. Other features can be understood and will become apparent with reference to the description and to the drawings.

BRIEF DESCRIPTION OF THE DRAWINGS

Figure 1:
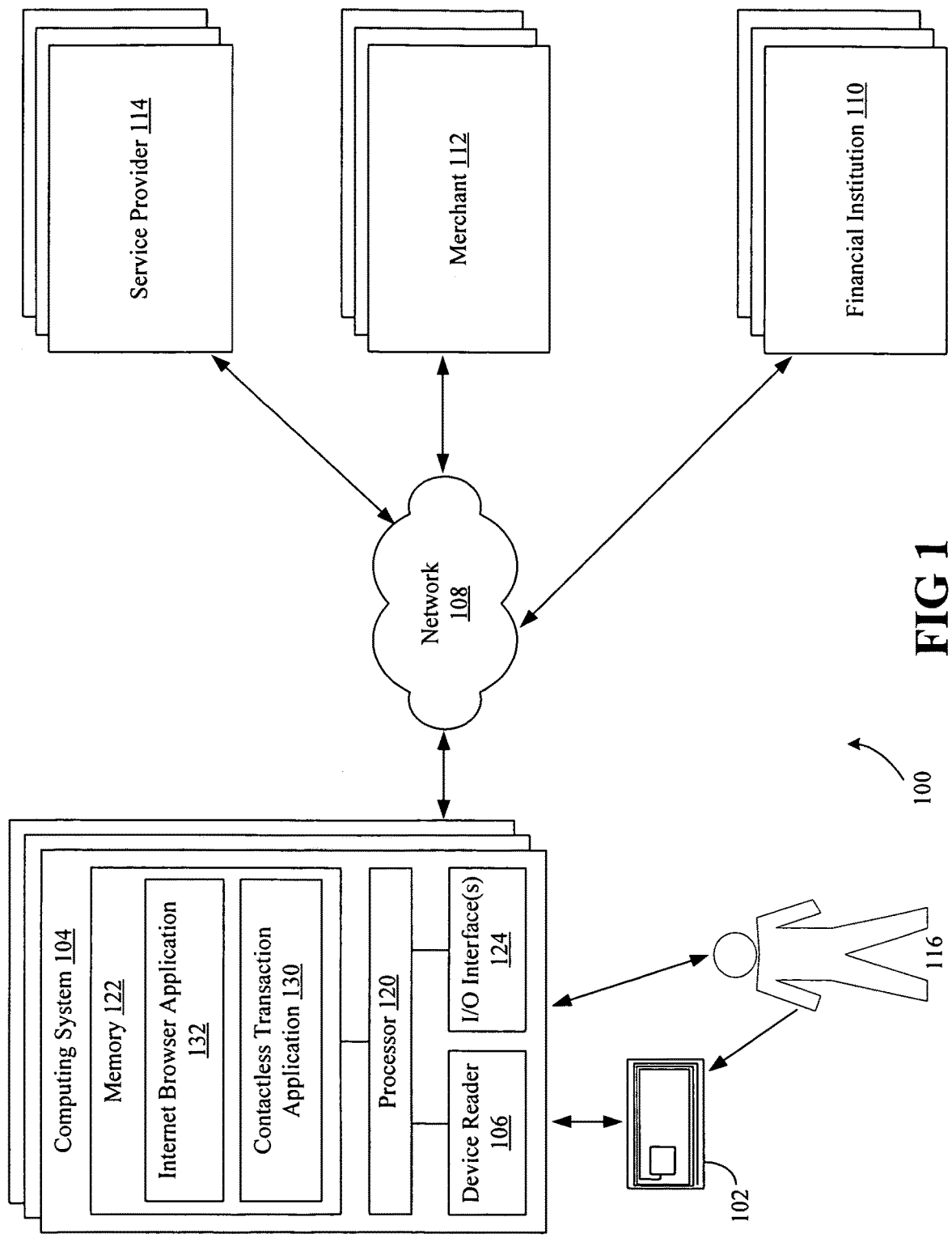
Figure 2:
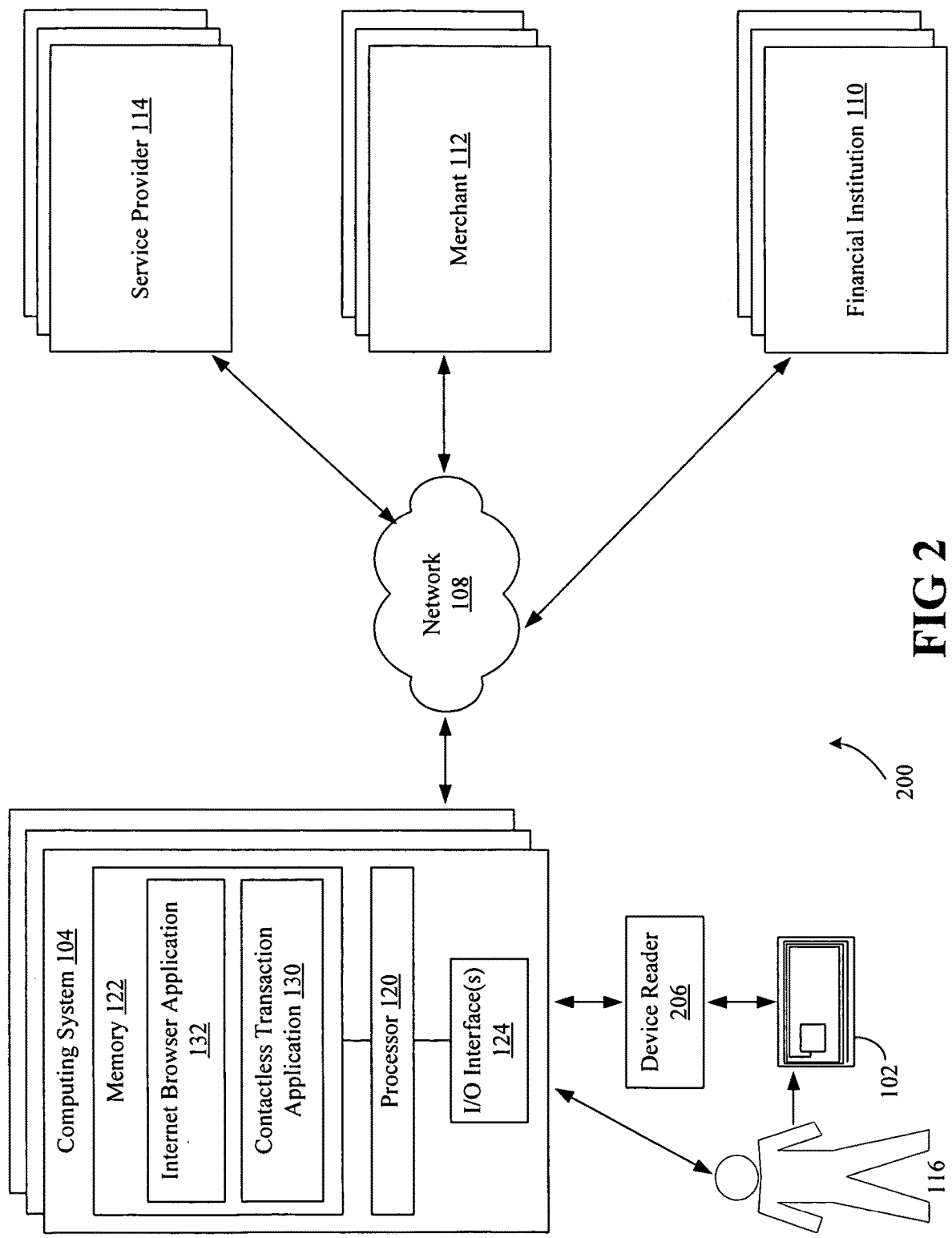
Figure 3:
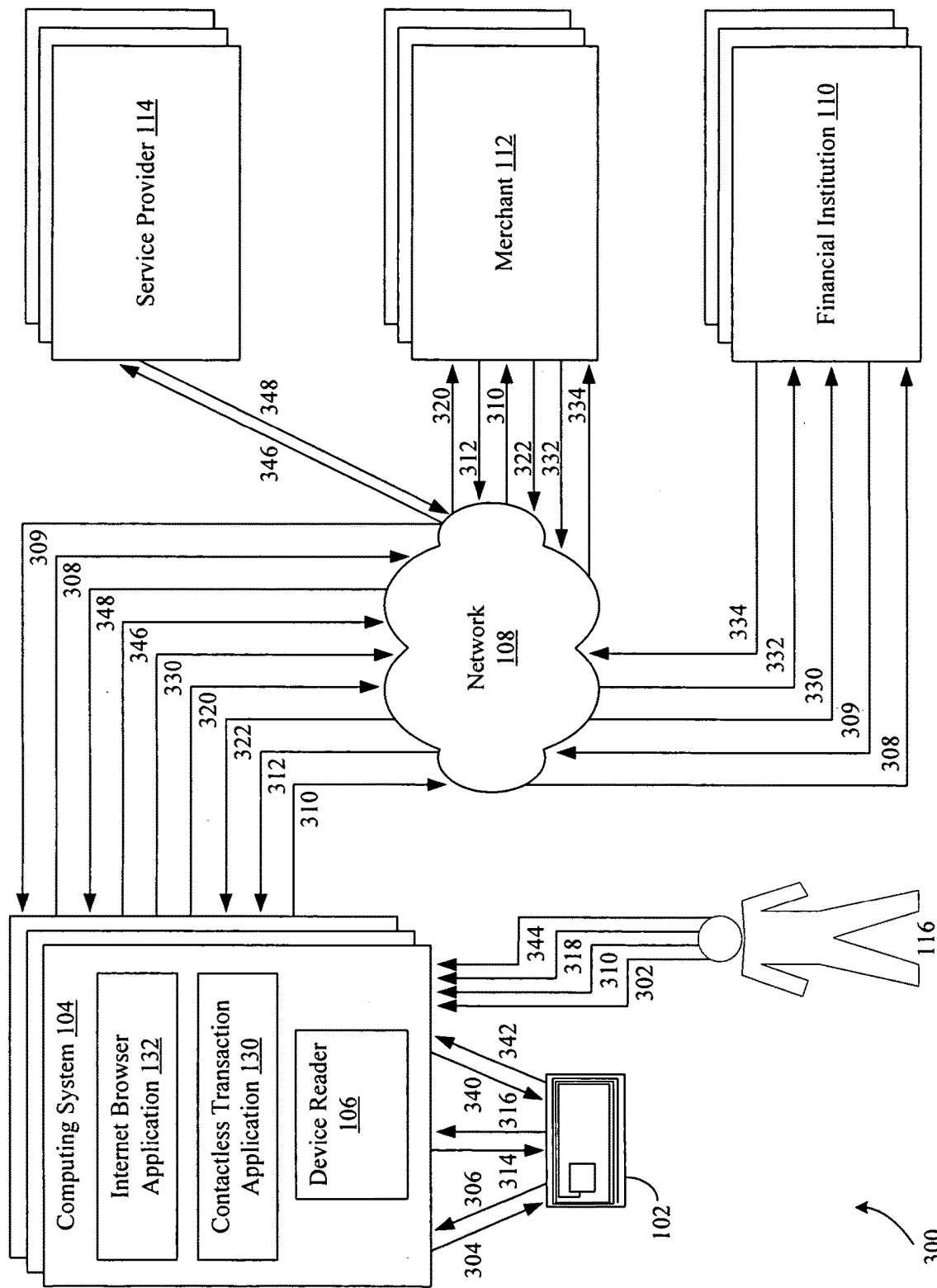
Figure 4:
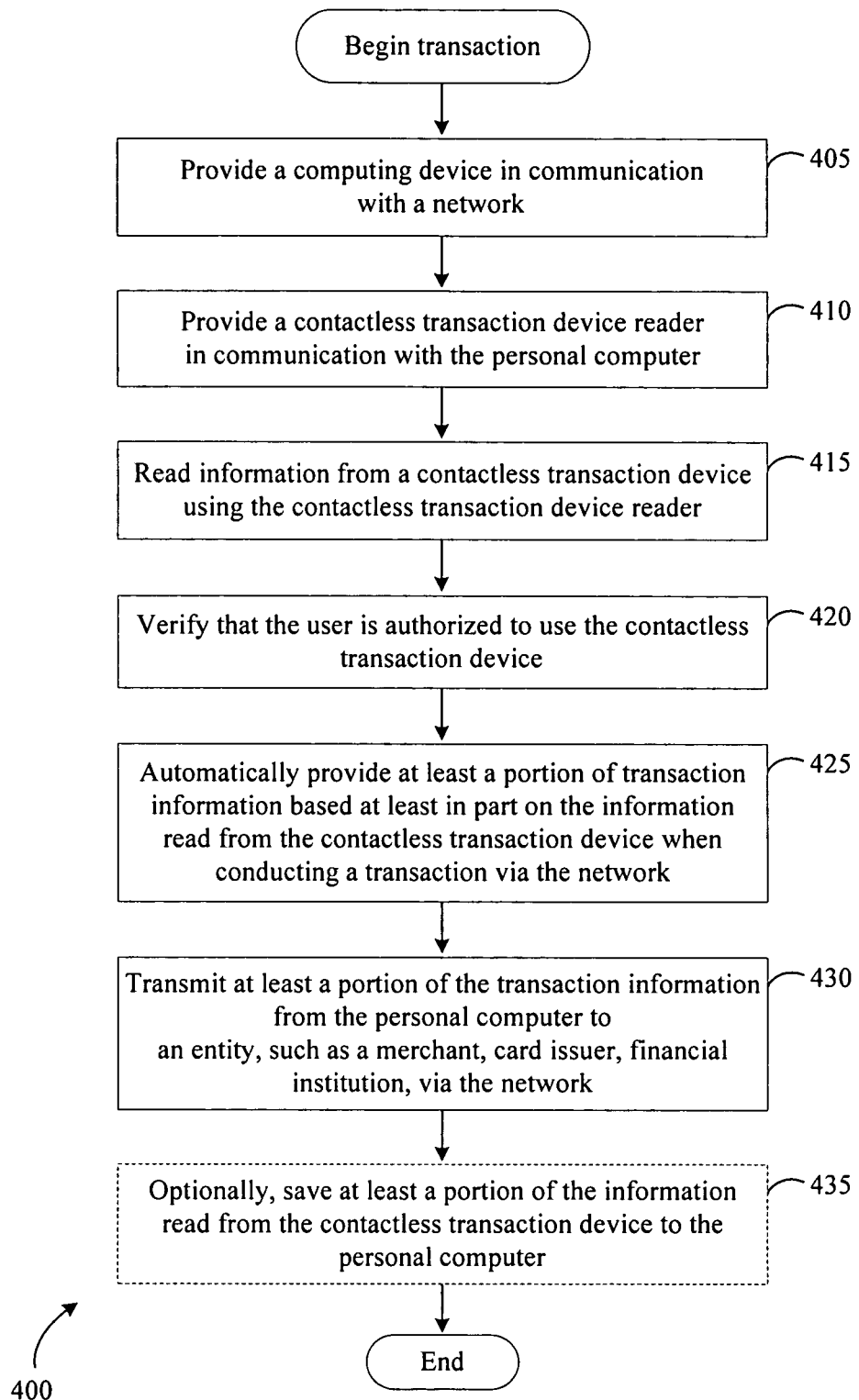
Figure 5:
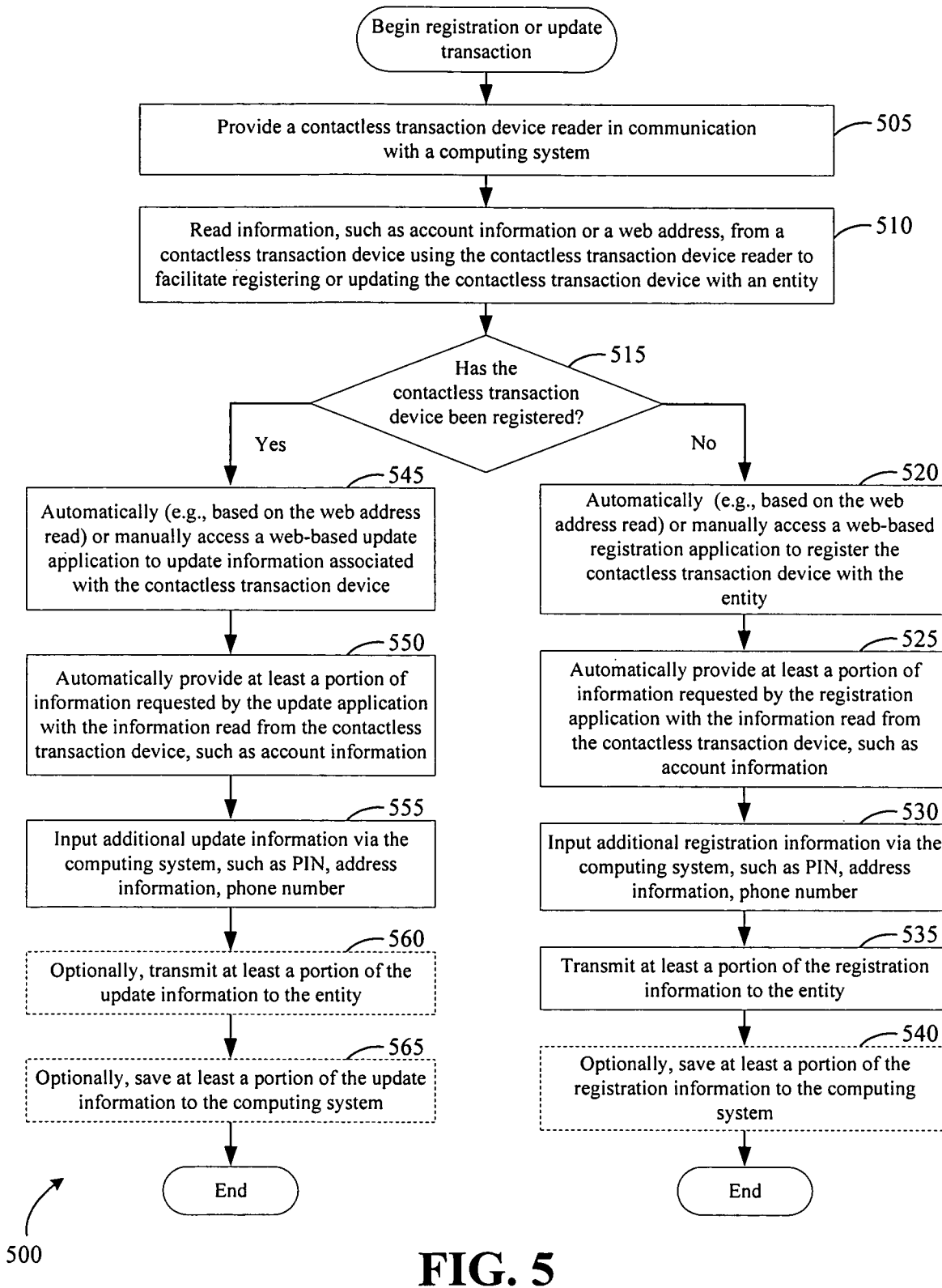
Figure 6:
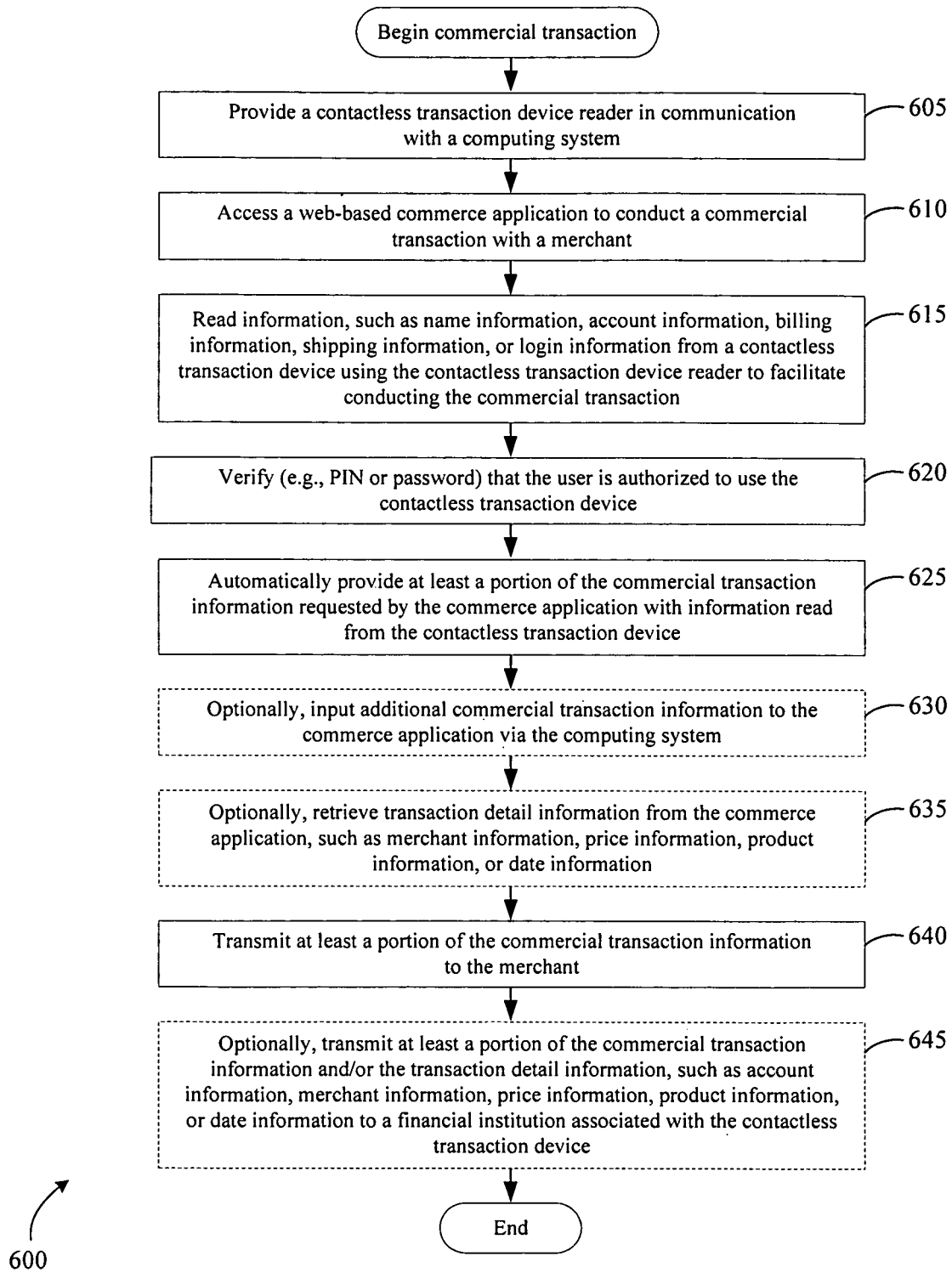
Figure 7:
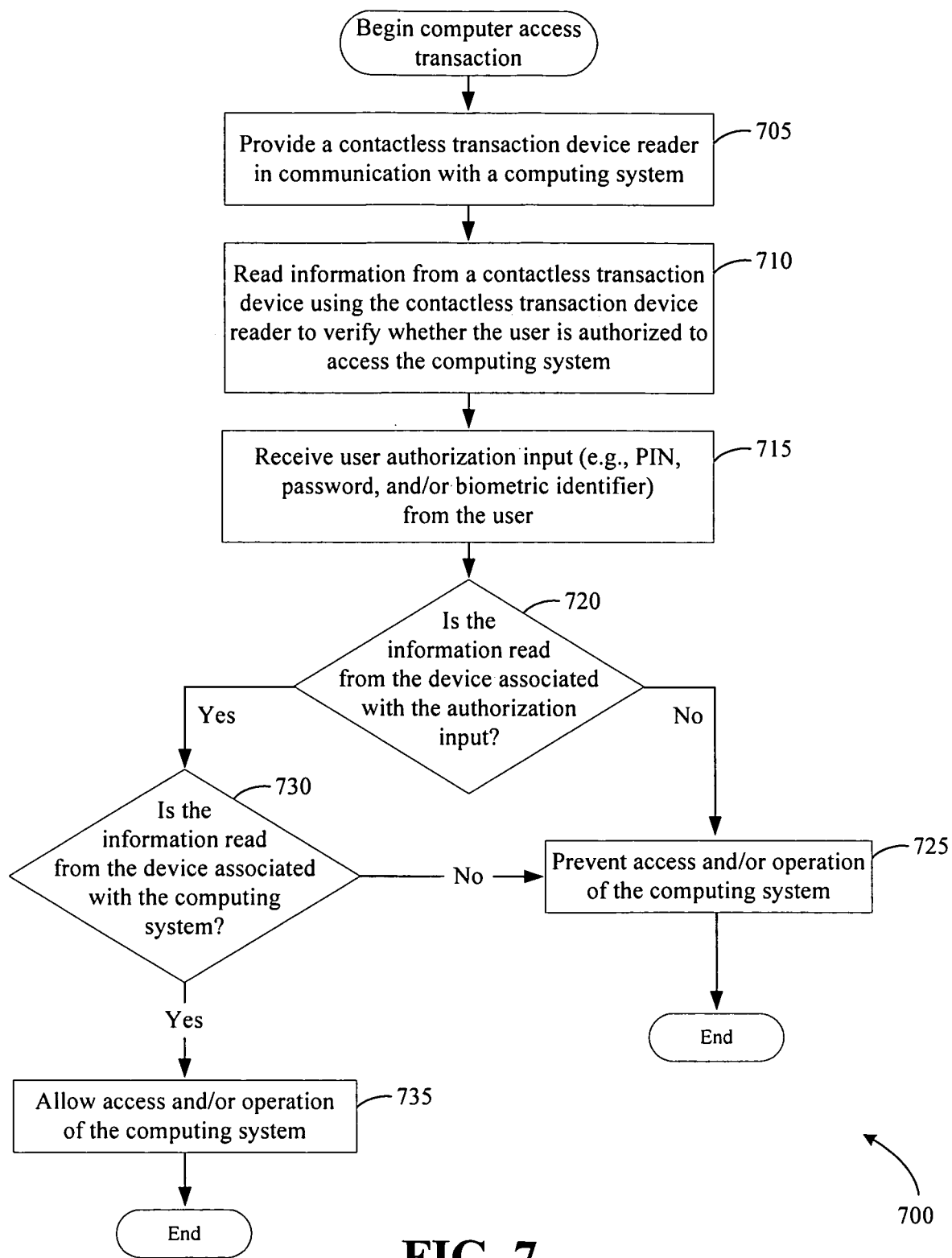
Figure 8:
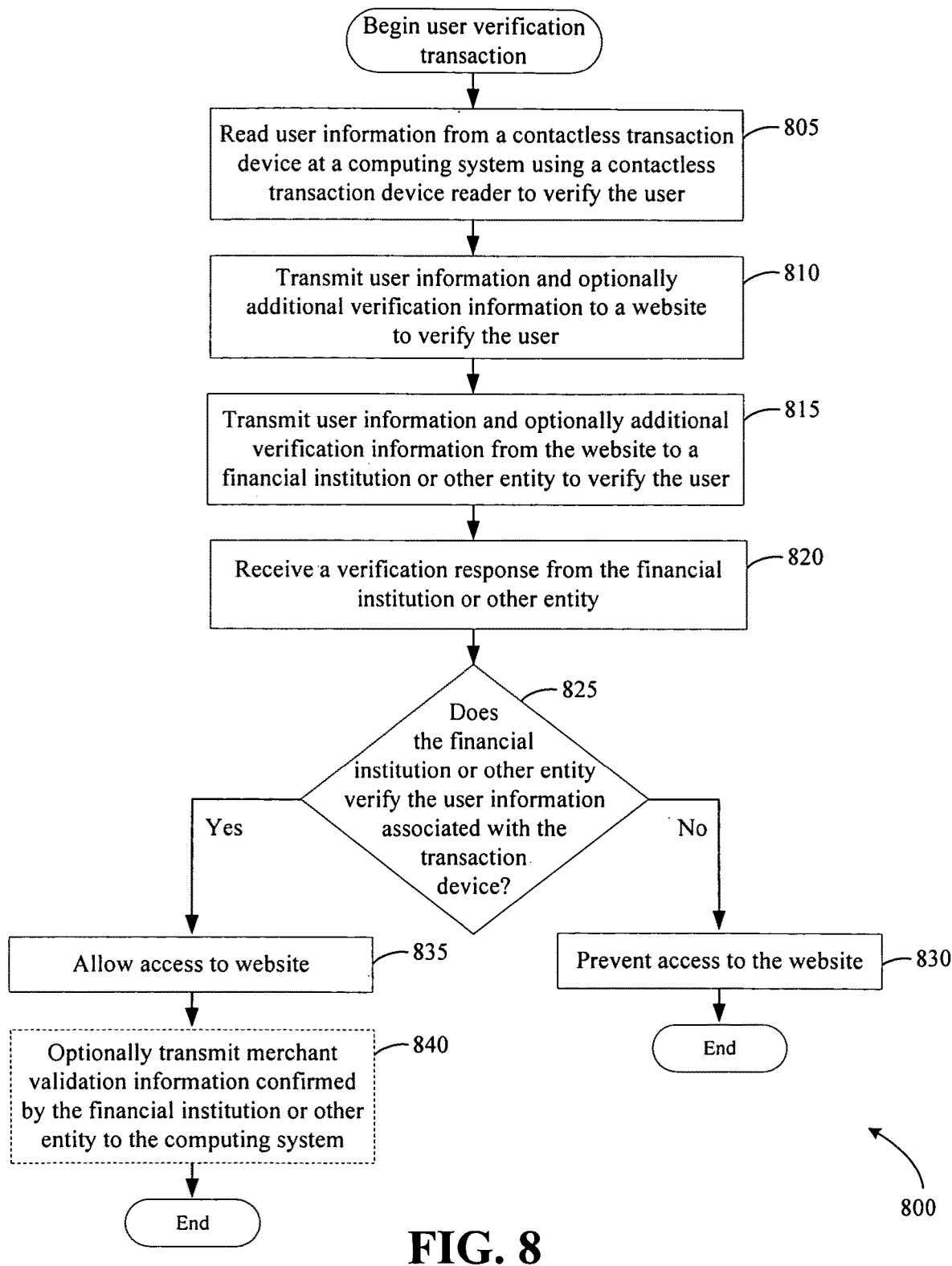

Having thus described the invention in general terms, reference will now be made to the accompanying drawings, which are not necessarily drawn to scale, and wherein:

FIG. 1 illustrates an example functional block diagram of an example system, according to one embodiment of the invention;

FIG. 2 illustrates an example functional block diagram of an example system, according to one embodiment of the invention;

FIG. 3 illustrates an example data flow of an example system and method, according to one embodiment of the invention;

FIG. 4 illustrates an example flowchart of an example method, according to one embodiment of the invention;

FIG. 5 illustrates an example flowchart of an example method, according to one embodiment of the invention;

FIG. 6 illustrates an example flowchart of an example method, according to one embodiment of the invention; and FIG. 7 illustrates an example flowchart of an example method, according to one embodiment of the invention; and FIG. 8 illustrates an example flowchart of an example method, according to one embodiment of the invention.

DETAILED DESCRIPTION OF EMBODIMENTS OF THE INVENTION

Example embodiments of the invention now will be described more fully hereinafter with reference to the accompanying drawings, in which some, but not all embodiments of the inventions are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the term "contactless transaction device" refers to any suitable device that may be used to store, receive, and transmit account information, authorization information, cardholder information, registration information and the like. For example, a contactless transaction device may be, but is not limited to, a radio frequency identification device ("RFID"), a cellular-based communication device, a Bluetooth enabled device, a Wi-Fi enabled device, an infrared device, and the like, operable to facilitate a consumer transaction, such as a credit transaction, a debit transaction, a stored value transaction, a device registration or information update transaction, an account inquiry transaction, a loyalty transaction, authentication request, verification request, data transmission or data update. An example contactless transaction device may be configured as a card, a sticker, a key fob, a wristband, or as any other wearable article. Many of the embodiments described herein refer to contactless transaction devices for simplicity; however, other embodiments may use other forms of transaction devices that may not be contactless, such as transaction devices having data stored in a magnetic strip and/or coded on a bar code. Accordingly, where a contactless transaction device is described, any other transaction device operable to store data or have data associated therewith may be used.

As used herein, the terms "personal computer," "computing system," and "personal computing system" may be used interchangeably, and each may refer to any suitable processor-based device for performing personal computing tasks, such as may be used to browse the Internet, conduct web-based transactions, perform word processing, manage personal files, and the like. For example, a personal computing system may include, but is not limited to, a personal desktop computer, a mobile or laptop computer, a handheld portable computer, a digital assistant, a personal digital assistant, a cellular phone, a mobile phone, a smart phone, a pager, a digital tablet, an Internet appliance, or any other personal processor-based device.

As used herein, the term "transaction" refers to any operation performed by a computing system that includes a transmission of information, a response including information, or an affirmation or denial of information, typically as may be required for a commercial transaction, for instance, a web-based commercial transaction purchasing, selling, and/or trading goods or services, when logging in or otherwise accessing websites or other applications, or a web-based registration or information update associated with one or more transaction devices.

As used herein, the terms "web-based transaction" and "online transaction" may be used interchangeably, and each may generally refer to any transaction with another entity, as defined and used herein, over a network, whether it be the Internet or any other public or private network.

In accordance with example embodiments of the invention, systems, methods, and apparatus that integrate a contactless transaction device reader, such as a RFID reader operable to communicate wireless with a RFID enabled contactless transaction device, with a computing system are provided. A contactless transaction device reader may be integrated with the computing system as a hardware/software component installed in the computer, or may be supplied as a peripheral device with the computer or separately as an after market product.

In one example embodiment, a computing system may be used to register a new contactless transaction device after purchase, using an online registration website. The device may be registered with a financial institution, such as an issuer of the contactless transaction device, a service provider, such as a third party for processing payment or loyalty transactions, a merchant, and the like. When presenting a contactless transaction device in proximity to a contactless transaction device reader, information read from the contactless transaction device may be used to automatically access the appropriate registration website, such as if the contactless transaction device stores a web address or other website identifying information. In one embodiment, information stored on the contactless transaction device may further be used to automatically populate or otherwise provide information requested by the registration website, such as account information, balance, limit, merchant information, issuer information, and the like. Registration may include activation steps to activate the contactless transaction device as a payment instrument, assigning a new personal identification number, associating the contactless transaction device with cardholder information and/or other accounts, such as bank accounts, debit accounts or loyalty accounts.

Similarly, in another embodiment, a computing system may be used to update information associated with a contactless transaction device account when read by a contactless transaction device reader. For example, upon reading a contactless transaction device, a user may be prompted to update information associated with the device, such as cardholder preferences, address information, loyalty information, and the like. The information update may be performed online via an information update website, for example, a website provided by the same entity with which the device is registered.

In one embodiment, instead of or in addition to transmitting registration information and/or update information to a remote entity, the computing system may store the information in a local memory. Stored locally, the registration and/or update information associated with the contactless transaction device may be used by one or more programs to automatically populate information requested during subsequent transactions, such as commercial transactions, to control access to the computing system, or to track activities associated with the contactless transaction device, for example.

According to another example embodiment, the computing system may be used to conduct web-based commercial transactions (or other transactions) with a merchant, such as online purchases or payments. While conducting the web-based transactions, the user may read information from a contactless transaction device with a contactless transaction device reader to facilitate providing the commercial transaction information requested, such as in payment forms, shipping forms, and the like. For example, the computing system may be operable to automatically populate an account number read from the contactless transaction device, and optionally additional information as may be stored on the contactless transaction device or that may be stored in local memory as a result of the device registration processing described earlier. Doing so may provide accurate and updated account information, may limit the amount of information required to be input manually by the user, and may reduce the amount of time to complete a web-based transaction. Although commercial transactions are primarily discussed herein according to various embodiments, it is appreciated that the computing system may provide information read from a contactless transaction device for other transactions as well, such as loyalty transactions, electronic bill payment transactions, requests for information, and the like.

In another embodiment, the computing system may be used to access other websites or software applications which request login information, such as a username and password. While accessing one or more of these websites or applications, the user may read login information from a contactless transaction device with a contactless transaction device reader to facilitate providing the login information when requested. Application programming executed by the computing system may also include instructions to recognize when one or more websites or other applications that are registered or otherwise pre-selected participants of presenting login information using a contactless transaction device. For example, rather than displaying a prompt for entering a username and password, a prompt to scan a contactless transaction device storing login information may be presented. In one embodiment, the prompt may be generated by computer programming executed by the computing system, such as an application programming interface operable to identify participating websites. Though in other embodiments, participating websites may have an alternative link or login form instructing the user to scan a contactless transaction device. Moreover, in some embodiments, websites may not need to be pre-selected participants, and computer programming executed by the computing system may be operable to prompt or otherwise instruct a user to optionally scan a contactless transaction device at any time login information is requested. It is also appreciated that the features of providing login information from a contactless transaction device is not limited to online applications, but can also be performed for locally run applications that request login or other security information.

A user's identity may be confirmed in part by a financial institution or other entity using information read from a contactless transaction device and/or associated with the device, according to another embodiment. For instance, when accessing a website or other online application the computing system may read user information from the contactless transaction device and transmit that information to a website host when accessing a website. The website host or other content provider may then transmit the information received from the contactless transaction device to a financial institution or other entity for verifying the user's identity. The financial institution may be in a position to verify the user's identity based on information read from the contactless transaction device if the device has been registered or otherwise authorized by the institution, at some earlier time. Accordingly, the financial institution (or other entity) may transmit an indication to the website host as to the identity of the cardholder or whether the user is authorized to use the contactless transaction device. The website host may then use this information to control access to the website or other application. Thus, because a contactless transaction device can be registered or otherwise associated with a financial institution or other entity, that entity is positioned to provide user identity verification, according to some embodiments.

According to yet another embodiment, access to a computing system in communication with a contactless transaction device reader may be controlled based at least in part on information read from a contactless transaction device. For example, comparing authorization information, such as a personal identification number or a password, read from the contactless transaction device to a user authorization input, such as a matching personal identification number or password, may indicate whether the user is authorized to use the contactless transaction device. The computing system may then determine whether the contactless transaction device is associated with the computing system, for example by comparing an account number or other device identifier with information stored locally on the computing system. If it is determined that both the contactless transaction device is associated with, and thus permits access to, the computing system, and that the user is authorized to use the contactless transaction device, access may be granted to the computing system.

Accordingly, a computing system and an associated apparatus integrated with or otherwise in communication with a contactless transaction device reader operable to read and process information from a contactless transaction device may facilitate many functions for which the computing system may be used.

FIG. 1 shows a schematic diagram of one example system 100 and an associated apparatus integrating a contactless transaction device reader with a computing system for retrieving information from or associated with the contactless transaction device and/or for managing or controlling access to the computing system. The system 100 and/or apparatus may include a contactless transaction device 102 used by a device user 116 (who may be referred to interchangeably as "cardholder," "user," and "device holder"), one or more computing systems 104, such as a personal computing system, having contactless transaction device reader 106 either integrated or in communication therewith. The computing system 104 may be in communication with one or more networks 108. The system 100 may further optionally include one or more financial institutions 110, one or more merchants 112, and one or more service providers 114, each also optionally in communication the network 108 for transacting with the computing system 104.

The contactless transaction device 102 may be any suitable device that may be utilized by a device user to facilitate any transaction wirelessly. In one example embodiment, the contactless transaction device 102 may be a typical payment card, such as a credit card, debit card, or stored value card, that is RFID enabled and has typical account data stored thereon or associated therewith. In other example embodiments, the contactless transaction device 102 may be a non-traditional transaction device operable for use in a consumer transaction, such as a digital assistant, a personal digital assistant, a cellular phone, a mobile phone, a smart phone, or any other processor-based device operable to communicate wirelessly, and/or configured in a non-traditional configuration, such as a key fob, a wristband, any other wearable article, and the like. Although any of the aforementioned example contactless transaction devices 102, or any other suitable transaction devices, may be used and still be within the scope of the appended claims, for simplicity a RFID payment card storing account data will be referred to in the following description. It is further appreciated that in other embodiments, a transaction device need not be a "contactless" transaction device, and may include the ability to communicate via wired, wireless, optical, and/or magnetic communications, such as a typical payment card having a magnetic strip and/or bar code with account data stored or coded thereon.

An example RFID enabled contactless transaction device 102 may include at least one integrated circuit microchip and at least one antenna or wireless transmitter and/or receiver, for transmitting and/or receiving information associated with a contactless transaction. The microchip and antenna may include circuitry operable to communicate electronic transaction details to a transaction terminal via a contactless reader or another RFID enabled communication device. The microchip includes a memory operable to store account data, user information, authorization information, and/or any other data. The microchip and memory may also be programmable and writeable such that the data stored thereon may be altered, for example by using a contactless transaction device reader 106.

In example embodiments in which the contactless transaction device 102 is a passive RFID device, other RFID enabled devices, including a contactless transaction device reader 106 integrated or in communication with a personal computing system 104, may provide power to or otherwise energize the microchip via the antenna by induction or via a separate induction loop. In one example embodiment, the antenna both receives signals from a contactless transaction device reader 106, which may also energize the microchip, and transmits signals from the microchip to a contactless transaction device reader 106. In other embodiments, however, a separate induction loop may be included with the antenna, to receive signals from a contactless transaction device reader 106 and to energize the microchip. For simplicity, "antenna" as used herein may refer to an antenna, an induction loop, and/or both an antenna and induction loop. In other embodiments, the contactless transaction device 102 may be an active or semi-active device, including a battery or other power source, such as a solar cell, to power the microchip independent of signals received from a contactless transaction device reader 106.

The contactless transaction device reader 106 may be any suitable wireless device reader adaptable for integrating with or communicating with a computing system and communicating wirelessly with other devices according to any wireless protocol, such as RFID, Bluetooth, infrared, and/or near field communications ("NFC"). According to one embodiment, the contactless transaction device reader 106 includes a RF transmitter and receiver, and is operable to communicate with RFID enabled devices, such as a RFID enabled contactless transaction device 102. In other embodiments, however, the device reader 106 may include a magnetic strip reader and/or a bar code scanner for reading information from transaction devices and/or products having data stored on a magnetic strip or coded in a bar code, and may communicate with a transaction device 102 including a magnetic strip and/or bar code instead of or in addition to a wireless communication means.

According to one embodiment, a transaction may be conducted by positioning the contactless transaction device 102 a proximate distance from the contactless transaction device reader 106. Example embodiments may also include having a contactless transaction device reader 106 transmit a signal via the antenna to the microchip, such as a handshake signal, instructing the microchip to start transmitting data that can be used to process the transaction. In example embodiments in which the contactless transaction device 102 and the contactless transaction device reader 106 are RFID enabled, the microchip and antenna may be designed to conform to ISO/IEC standards for contactless transaction cards and proximity cards, including the ISO/IEC 14443 standard and/or the ISO/IEC 15693 standard, among others. In one example in which the contactless transaction device 102 conforms to the ISO/IEC 14443 standard, a contactless transaction device reader 106 may send and receive messages via the antenna to/from the microchip via a modulated RF field that has a carrier frequency of approximately 13.56 MHz. Accordingly, any of the contactless transaction device readers 106 described herein may be operable to communicate with a contactless transaction device 102 following the same, similar, or otherwise conforming standards.

According to one aspect of the invention, account information and/or user information may be stored in the memory of the contactless transaction device 102. Account information and user information may be any data for use in association with or relating to a typical consumer transaction, such as a web-based purchase or when accessing a website or other software application. Example account and user information may include, but are not limited to, account numbers, account information, expiration dates, balances, limits, transaction histories, account holder name, billing address, shipping address, issuer information, or login information. In one embodiment, the memory of the contactless transaction device 102 may store a unique identifier, such as an account number, which may refer to remotely stored account information or user information associated with the unique identifier. The remote information may be any of the above-referenced account data, or any additional transaction related data. The remotely stored information may be stored in one or more remote locations, such as a service provider 114, a merchant or retailer 112, and/or a financial institution 110, which may include a bank, an issuer, and/or a third party payment processor.

With reference again to FIG. 1, the computing system 104 may be any suitable processor-based device for performing personal computing tasks, such as may be used to browse the Internet, conduct web-based transactions, perform word processing, manage personal files, and the like. For example, the computing system 104 may include, but is not limited to, a personal desktop computer, a mobile or laptop computer, a handheld portable computer, a digital assistant, a personal digital assistant, a cellular phone, a mobile phone, a smart phone, a pager, a digital tablet, an Internet appliance, any other personal processor-based device, and the like. The computing system 104 may include at least one processor 120, a memory 122, one or more input/output ("I/O") interface(s) 124, and one or more network interfaces 126 (also referred to interchangeably herein as "communications interface"). The memory 122 may store data files and various software program modules, such as a contactless transaction application 130 program for facilitating integration between the contactless transaction device reader 106 and the other components of the computing system 104. The memory 122 may also include an Internet browser application 132 program can be adapted to access and/or receive one or more web pages and associated content from at least one remotely located server, such as a merchant 112 system, a financial institution 110 system, or a website host server, and to transmit information in response to the web pages accessed or received. The memory 122 may also include an operating system ("OS"), such as, but not limited to, Microsoft Windows®, Apple OSX™, or Linux, and a database management system ("DBMS") to facilitate management of data files and data stored in the memory 122, for example.

The contactless transaction application 130 may include programming instructions implementing logic for retrieving information from a contactless transaction device 102 for subsequent use, such as to facilitate registering a contactless transaction device 102, updating information associated with a contactless transaction device 102, to provide information to facilitate web-based commercial transactions or login requests, and/or to control access to the computing system 104, as described in more detail herein. Moreover, the contactless transaction application 130 may include programming instructions to store information associated with the contactless transaction device 102 in a memory of the computing system 104, so as to be available for subsequent processing.

The I/O interfaces 124 of the computing system 104 may also facilitate communication between the computing system 104 and one or more input/output devices, for example, a display, keyboard, keypad, mouse, control panel, touch screen display, microphone, and the like, that facilitate user interaction with the computing system 104. The one or more input/output devices may be utilized to collect information from any user of the computing system 104, for example, from the device user 116 when conducting a commercial transaction. The contactless transaction device reader 106 may also be considered an input/output device of the computing system to facilitate communicating with a contactless transaction device 102.

The one or more network interfaces 126 may take any of a number of forms, such as a network interface card, a modem, a wireless network card, and the like. The network interfaces 126 may facilitate connection of the computing system 104 to one or more suitable networks 106, for example, a local area network, a wide area network, the Internet, an intranet, a telephone network, a cellular network, and the like, such as may be used when communicating with one or more of the other entities, such as a financial institution 110, a merchant 112, and/or a service provider 114 system. Additionally, other components may be included in the computing system 104 as desired in various embodiments of the invention.

As mentioned, the system 100 may optionally include one or more financial institutions 110 that include any number of suitable processing systems and/or processing devices in communication with the computing systems 104 over a network 108, to facilitate processing a commercial transaction, such as a balance inquiry, a funds transfer, a loyalty transaction, processing a payment of a web-based transaction, and the like. A financial institution 110 may be a bank, an issuer, a third party payment processor, or any combination thereof that may participate in processing a transaction and/or provide access to a consumer's account information. The financial institution 110 may further store and maintain contactless transaction device 102 information, such as registration information, cardholder information, and cardholder preferences, as may be entered and/or updated during device registration or update processing, as described in more detail herein. The computing systems 104 and the one or more financial institutions 110 may be in communication over a public network, such as the Internet or a telephone network, or a private network, such as a private bank network or an intranet. In embodiments of the invention, the one or more financial institutions 110 may include a transaction processing application program for processing transactions from the computing system 104, such as a balance inquiry, a funds transfer, a loyalty transaction, processing a payment of a web-based transaction, and the like. The financial institution 110 may also include one or more systems and/or devices that facilitate back-end processing of a transaction, such as one or more credit card processing systems, one or more debit card processing systems, one or more stored value card processing systems, one or more card issuers, and the like. In one example embodiment, the financial institution 110 may also include a database management system in communication with a data store for remote storage and management of account information, and/or user information associated with one or more unique identifiers stored on a contactless transaction device 102. Each of the one or more financial institutions 110 may include an appropriate processor driven device that facilitates processing of a transaction.

The system 100 may also include one or more merchants 112 that include any number of suitable processing systems and/or processing devices in communication with the computing systems 104 over a network 108, to facilitate processing a commercial transaction, such as a web-based transaction by an online retailer. The computing systems 104 and the one or more merchants 112 may be in communication over a public network, such as the Internet or a telephone network, or a private network. In embodiments of the invention, the one or more merchants 112 may include a transaction processing application program for processing transactions from the computing system 104, such as for processing a payment of a web-based transaction, or for interfacing with one or more financial institutions 110 for processing payment associated with the web-based transaction. In one embodiment, the merchants 112 may store and maintain contactless transaction device 102 information, such as registration information, cardholder information, and cardholder preferences, as may be entered and/or updated during device registration or information update processing, instead of or in addition to a financial institution 110. In one example embodiment, the merchants 112 may also include a database management system in communication with a data store for remote storage and management of user information and/or account information associated with one or more unique identifiers stored on a contactless transaction device 102. Each of the one or more merchants 112 may include an appropriate processor driven device that facilitates processing of a transaction.

The system 100 may also optionally include one or more service providers 114 that include any number of suitable processing systems and/or processing devices in communication with one or more of the computing systems 104, via one or more networks 108, for example. In one embodiment, the service provider 114 may store and maintain contactless transaction device 102 information, such as registration information, cardholder information, and cardholder preferences, as may be entered and/or updated during device registration or update processing, and/or facilitate other transactions, such as commercial transactions instead of or in addition to a financial institution 110. In one example embodiment, the service provider 114 may include a database management system in communication with a data store for remote storage and management of account information, user information, and/or authorization information associated with one or more unique identifiers stored on a contactless transaction device.

Generally, any of the memory, such as the memory 122 of the computing system 104, and any other data storage devices or databases, can store data and information for subsequent retrieval. In this manner, the system 100 can store various received or collected information in memory or a database associated with a computing system 104, a financial institution 110, a merchant 112, and/or a service provider 114. The memories and any other data storage devices or databases can be in communication with each other and/or other databases, such as a centralized database, or other types of data storage devices. When needed, data or information stored in a memory or database may be transmitted to a centralized database capable of receiving data, information, or data records from more than one database or other data storage devices.

Suitable processors, such as the processor 120 for the computing system 104, or for a financial institution 110 system, a merchant 112 system, and/or a service provider 114 system may include a microprocessor, an ASIC, and state machine. Example processors can be those provided by Intel Corporation (Santa Clara, Calif.), AMD Corporation (Sunnyvale, Calif.), and Motorola Corporation (Schaumburg, Ill.). Such processors include, or may be in communication with media, for example computer-readable media, which stores instructions that, when executed by the processor, cause the processor to perform the elements and/or functions described herein. Embodiments of computer-readable media include, but are not limited to, an electronic, optical, magnetic, or other storage or transmission device capable of providing a processor with computer-readable instructions. Other examples of suitable media include, but are not limited to, a floppy disk, CD-ROM, DVD, magnetic disk, memory chip, ROM, RAM, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may include code from any computer-programming language, including, for example, C, C++, C#, Visual Basic, Java, Python, Perl, and JavaScript. Furthermore, any of the processors may operate any operating system capable of supporting a browser or browser-enabled application including, but not limited to, Microsoft Windows®, Apple OSX™, and Linux.

FIG. 2 shows a schematic diagram of another example embodiment of a system 200 and an associated apparatus in which a peripheral contactless transaction device reader 206 resides external to, but is in communication with, a computing system 104 and operable to facilitate retrieving information from or associated with a contactless transaction device 102 and/or for managing or controlling access to the computing system 104. The system 200 and/or apparatus operates in the same or similar manner as is described with reference to FIG. 1. Instead, however, a peripheral contactless transaction device reader 206 may be adaptable to communicate with one or more I/O interfaces 124, such as by wired or wireless communication. For example, the peripheral contactless transaction device reader 206 may plug directly into a serial/COM port, such as an RS-232, DB-25, or RS-242 serial port, a universal serial bus ("USB") port, or an IEEE 1394 port (e.g., "FireWire"), for example. In another example, the peripheral contactless transaction device reader 206 may communicate with an I/O interface 124 using a wireless protocol, such as by Bluetooth, infrared, Wi-Fi, and the like. The contactless transaction application 130 of the computing system 104 may facilitate communications with a contactless transaction device 102 using the peripheral contactless transaction device reader 206 and provide programming instructions for further processing the information read from the contactless transaction device, as described in more detail herein.

FIG. 3 shows an example data flow 300 between the components and entities shown associated with the system 100 to facilitate transactions using a computing system, such as the computing system 104 described with reference to FIG. 1, having an integrated or peripheral contactless transaction device reader, such as the contactless transaction device reader 106 described with reference to FIG. 1 or the peripheral contactless transaction device reader 206 described with reference to FIG. 2. For simplicity, the example data flow 300 illustrates and will describe using a computing system having an integrated contactless transaction device reader 106, though the same or similar data flows are applicable to embodiments having a peripheral contactless transaction device reader 206.

As described according to one embodiment, a device user 116 may use a computing system 104, such as a personal computer, to access one or more commerce applications and perform a commercial transaction, such as a web-based purchase or payment. The device user 116 may also have a contactless transaction device 102, which is conventionally used to facilitate processing an account transaction, such as a payment at a retailer or merchant terminal. However, according to embodiments of the invention, the contactless transaction device 102 may be presented to the computing system 104 and its contactless transaction device reader 106 to simplify related transactions.

In one embodiment, the device user 116 may use the computing system 104 to register a contactless transaction device 102 with a financial institution 110, such as the contactless transaction device issuer or another bank, or another entity, such as a service provider or a merchant. The computing system 104 may also be used to update information associated with the contactless transaction device 102, such as account information, user information, preferences, and the like. With reference to FIG. 3, according to one embodiment, the user may initiate 302 an update or registration transaction on the computing system 104 by accessing a program or application. In one example, the user may access a website, such as maintained by a financial institution 110, or other entity, to register or update the contactless transaction device 102, for example by using the Internet browser application 132.

In another embodiment, the device user 116 need not initiate 302 the transaction by accessing an application or program, because upon presenting the contactless transaction device 102, the computing system may automatically access a website based upon information stored on or associated with the contactless transaction device 102. For example, the contactless transaction device 102 may have website address information and instructions, such as a script or other programmed application, that will cause the computing system 104 to automatically access the website upon reading the information from the device.

With reference to FIG. 3 again, the contactless transaction device reader 106 of the computing system 104 may transmit 304 a request for information account data from the contactless transaction device 102. The request for information may be transmitted 304 by way of radio frequency communication when the contactless transaction device 102 is in proximity to the contactless transaction device reader 106, energizing the microchip and causing a response.

In response, the contactless transaction device 102 may transmit 306 information stored in the memory of the contactless transaction device 102. The information may include name information, address information, billing information, shipping information, account information, authorization information, user preference information, registration information, such as a web address, a program script, and the like. In one embodiment, the registration information transmitted 306 from the contactless transaction device 102 may cause a website or other program to be launched by the computing system 104 to facilitate registration of the contactless transaction device.

In response, the computing system 104 may transmit 308 via a network, such as the Internet, at least some of the information received from the contactless transaction device 102 to an entity responsible for facilitating the maintenance of contactless transaction device 102 data, such as a financial institution 110. In other embodiments, the computing system may transmit registration or update information to a service provider, a merchant, or any other entity. When registering the contactless transaction device 102, the information transmitted 308 to the financial institution 110 may include an account number, a card number, a pre-defined balance, spending limits, a pre-defined personal identification number, or any other information that may be used to register and/or activate the contactless transaction device 102. If updating information associated with the contactless transaction device 102 that may be maintained by the financial institution 110 (or any other entity), the information transmitted 308 to the financial institution 110 may include an account number, a card number, a deposit amount, a new balance, a funding account number, cardholder information, loyalty information, a pre-defined balance, spending limits, an updated personal identification number, a pre-defined personal identification number, or any other information that may be updated or may be used to update information associated with the contactless transaction device 102.

In one embodiment, the financial institution 110 may optionally transmit 309 via the network a response to the registration and/or update information transmitted 308 from the computing system 104. The response may be any confirmation, such as an acceptance or rejection (e.g., yes/no, 0/1, valid/invalid, etc.).

In one embodiment, registration or update information may be stored in a local memory of the computing system 104, instead of or in addition to being transmitted to the financial institution 110 or other entity.

According to another example embodiment illustrated by FIG. 3, the device user 116 may use a computing system to process a commercial transaction, such as an online purchase transaction, an online payment transaction, a website or other software application login transaction, or any other transaction in which information stored on or associated with the contactless transaction device 102 may be transmitted from the computing system 104 to another entity. With reference to FIG. 3, the device user 116 may initiate 310 a commercial transaction via a network 108 with a merchant 112, such as a web-based online purchase transaction through a website using the Internet browser application 132 of the computing system 104. In response, the merchant 112 (or through the merchant's service provider, such as a web site host, for example) may transmit 312 a web page (or other application) via the network 108 to complete the commercial transaction, requesting certain commercial transaction information from the device user 116 for completing the transaction.

When completing the request for commercial transaction information from the merchant 112, the device user 116 may cause the contactless transaction device reader 106 to request 314 information from the contactless transaction device 102, for example by placing the contactless transaction device 102 in proximity to the device reader 106 as described herein. In response, the contactless transaction device 102 may respond 316 with at least part of the information stored in the memory of the contactless transaction device 102. For example, the contactless transaction device may transmit an account number, cardholder information, such as name and address information, billing information, shipping information, and the like.

Upon receiving 316 the information from the contactless transaction device 102, the computing system 104 and its contactless transaction application 130 may automatically populate at least some of the commercial transaction information requested 312 by the merchant 112 in the web page. For example, the contactless transaction application 130 may automatically populate account information, shipping information, billing information, name information, login information, and the like, with information transmitted 316 from the contactless transaction device 102.

According to one embodiment, the web page transmitted 312 by the merchant 112 may indicate that it is eligible to participate in a contactless transaction device transaction and provide a means to access and present information, such as a hyperlink to a specialized page, to facilitate interacting with the contactless transaction device 102 and the contactless transaction application 130 of the computing system 104. In another embodiment, however, the contactless transaction application 130 may at least partially populate forms without requiring a separate interface or web page presented by the merchant 112, such as by executing scripts or other application programming interfaces to read the form fields and match the information obtained from the contactless transaction device 102.

In one embodiment, the web page transmitted 312 by the merchant 112 and at least partially populated by information read from the contactless transaction device 102 may not be complete, such that the device user 116 may have to provide 318 additional information manually through the computing system 104. For example, the device user 116 may provide 318 quantity information, alter shipping information, confirm information presented by the contactless transaction device 102, or otherwise during the transaction.

Upon completing the web page, the computing system 104 may transmit 320 the completed transaction information to the merchant 112 via the network 108, such as by submitting the web page over the Internet for processing. The merchant may optionally transmit 322 a status message to the computing system 104 via the network 108 for display to the device user 116, and optionally for saving in a local memory of the computing system 104.

In one embodiment, the merchant 112 may complete the purchase transaction processing with the financial institution 110, such as to debit the account associated with the contactless transaction device 102, as is known.

In one embodiment, the contactless transaction device 102 may store one or more unique identifiers associated with remotely stored information. Accordingly, the computing system 104 may transmit the one or more unique identifiers to the remote entity, such as a financial institution or a service provider, and receive more complete information associated with the unique identifiers in response prior to automatically populating such information in the web page or other web-based commerce application.

Still with reference to FIG. 3, in one embodiment, the contactless transaction application 130 of the computing system 104 may transmit 330 information associated with a completed transaction to the financial institution 110 via the network 108, such as a completed online purchase transaction as previously described. This may be performed automatically, for example by the contactless transaction application 130 or as part of the web page submission processed by the merchant, or may be performed manually responsive to receiving device user's 116 instructions. Doing so may allow the device user 116 to give the financial institution 110 advanced notice of the transaction, or to confirm the transaction to reduce fraud, for example. Moreover, using the contactless transaction device 102 when conducting an online transaction may give the device user 116 certain advantages, such as incentives created by the device issuer or the merchants, and transmitting 330 the transaction information may aid in tracking those uses.

In additional embodiments, an entity hosting a website or other online application, such as a merchant 112, may transmit 332 to a financial institution 110 information received from the computing system 104 that was read or otherwise associated with the contactless transaction device 102, which may be used to verify the device user's 116 identity when accessing a website. For example, the information transmitted 320 to a merchant 112 may represent login or other access information read from the contactless transaction device. In response, the merchant 112 (or other entity hosting or otherwise associated with a website) may transmit 332 the information to the financial institution 110 to confirm the user's identity based on information read from or associated with the device, for instance an account number, a username, and/or additional authorization information which may be generated by the financial institution. In response, the financial institution 110 may then transmit 334 to the merchant 112 a verification response indicating the user's identity and/or a success/failure message. Accordingly, a website host or other content provider may control access to online content based on verifications performed by a financial institution 110 or other entity.

According to another embodiment of the invention, the contactless transaction device 102 and the contactless transaction application 130 of the computing system 104 may be used to control access to the computing system 104. For example, still with reference to FIG. 3, when attempting to access the computing system 104, the device user 116 may present the contactless transaction device 102 in proximity to the contactless transaction device reader 106 to verify the device user's 116 authority. When placed in proximity to the contactless transaction device 102, the contactless transaction device reader 106 may request 340 authorization information from the contactless transaction device 102, such as a personal identification number, a password, or an account number. In response, the contactless transaction device 102 may transmit 342 the authorization information to the computing system 104.

The contactless transaction application 130 may also request or otherwise provide a means for the device user 116 to enter 344 user authentication input to the computing system 104. For example, the user may enter the same personal identification number or password stored on or associated with the contactless transaction device 102.

Upon receiving 342 the authorization information from the contactless transaction device 102 and upon receiving 344 the user authorization input from the device user 116, the contactless transaction application 130 may verify the user authorization input based on the authorization information received from the contactless transaction device 102, to verify that the device user 116 is authorized to use that contactless transaction device 102. Then, the contactless transaction application 130 may also verify the information received from the contactless transaction device 102 against information stored locally or remotely (such as with the service provider 114) to verify that the contactless transaction device 102 is authorized to allow access to the computing system 104. For example, the computing system 104 may store information in a local memory, which may be encrypted or otherwise restricted, that indicates which contactless transaction devices 102 are approved to access the computing system 104. The access may be based on the authorization information retrieved 342 from the contactless transaction device 102, from the user authorization input entered 344 by the device user 116, or from account information or other information stored on the contactless transaction device.

In one embodiment, the computing system 104 may transmit 346 some or all authorization information to a service provider 114 (or other entity) via a network 108 to aid in verifying the authority to access the computing system. In response, the service provider 114 may respond 348 to the computing system 104 via the network 108 with a status message, such as an approval or denial. In other embodiments, however, the computing system 104 may simply receive information from the service provider 114 and perform the verification locally based at least in part on that information.

In example embodiments, some or all of the data transmitted between entities in the system, as described by the systems 100, 200, associated apparatus, and the data flow 300 illustrated in FIGS. 1-3, may be encrypted to increase security and maintain privacy of the information. Certain data may be password protected, the systems may include administrative functions that include unique user identification for any person and/or entity operating and/or accessing the systems, that vary access to certain data based on user roles and responsibilities, and that can terminate user access to one or more of the systems. Additionally, the Internet browser application 132, the contactless transaction application 130, and/or any other data transmission/communication systems, as described herein that may be executed by one or more of the above described entities to transmit or receive information, may include an encryption/decryption module and/or a user access administration module to satisfy the security and privacy of financial account information and/or user information. Moreover, in one embodiment, the contactless transaction device reader 106 may include an encryption module to encrypt or otherwise secure data read from the contactless transaction device 102 by the contactless transaction device reader 106 prior to transmitting it to the computing system 104. In response, the computing system 104 may then decrypt data read from the contactless transaction device 104 and encrypt data prior to transmission to another entity, such as may be performed by the contactless transaction application 130.

Accordingly, with each of the various transactions illustrated by the data flow 300, presenting a contactless transaction device 102 to a contactless transaction device reader 106 associated with a computing system 104 may facilitate certain activities using the computing system 104, such as registering or activating the contactless transaction device 102 and/or updating information associated therewith, automatically populating transaction information when conducting a commercial transaction, and/or controlling access to the computing system 104.

One skilled in the art may recognize the applicability of embodiments of the invention to other environments, contexts, and applications. One will appreciate that components of the systems 100, 200 and data flow 300 shown in and described with respect to FIGS. 1-3 are provided by way of example only. Numerous other operating environments, system architectures, device configurations, and data flows are possible. Accordingly, embodiments of the invention should not be construed as being limited to any particular operating environment, system architecture, device configuration, or data flow.

Example methods and processes which can be implemented with the example systems 100, 200, associated apparatus, and data flow 300, as well as other system, apparatus, and data flow embodiments, are described by reference to FIGS. 4-7.

FIG. 4 is a flowchart of one example method 400 of integrating a contactless transaction device reader with a computing system to facilitate completing a transaction using the computing system. The method 400 may include receiving information from a contactless transaction device that may be used to facilitate a transaction, such as registering or activating a contactless transaction device 102 or updating information associated therewith, or to facilitate a commercial transaction (or other transaction), such as a web-based online purchase or login to a website or other software application.

The method 400 may begin at block 405. At block 405, a computing system in communication with a network, such as a computing system 104 and a network 108 as described with reference to FIGS. 1-3, may be used by a user. The computing system 104 may be any computing system, as described herein, and may further have stored thereon one or more application programs operable for accessing and displaying registration websites, information update websites, and online commerce websites, and operable for automatically populating transaction information requested by such websites, such as an Internet browser application 132 and a contactless transaction application 130, respectively, as described with reference to FIGS. 1-3.

In one example embodiment, the computing system 104 may be used to register and/or activate a new contactless transaction device 102 after purchase using an online registration website. Similarly, in another embodiment, the computing system 104 may be used to update information associated with an account associated with the contactless transaction device 102. As described herein, in one embodiment, the computing system 104 may automatically access a device registration or information update website or other online application responsive to receiving information stored on or associated with the contactless transaction device 102. In another embodiment, however, the user may access the website manually.

In another example embodiment, the computing system 104 may be used to access a web-based commerce application hosted by or on behalf of a merchant, such as may be used to conduct an online purchase transaction or online payment. In this example, the user may access the commerce website, conduct their shopping or payment processing, and upon navigating to one or more payment web pages, forms, or other applications, or one or more information web pages, forms, or other applications, information stored on and/or associated with the contactless transaction device 102 may be provided automatically, as described herein. In another example, when navigating to a website or when accessing a software application, login information may be requested, such as a username and/or password.

Following block 405 is block 410, in which a contactless transaction device reader, such as a contactless transaction device reader 106 as described with reference to FIGS. 1-3, in communication with the computing system 104 is provided.

Following block 410 is block 415, in which the contactless transaction device reader 106 may request or otherwise receive information from a contactless transaction device 102. The contactless transaction device 102 includes a memory operable to store various information, such as may be typically used to process commercial transactions (or other transactions), including an account number (and optionally a balance, an expiration date, a limit, a personal identification number, issuer information, and the like). In one embodiment, however, the memory of the contactless transaction device 102 may further be operable to store additional information that may be used to facilitate registering the device if new and/or updating information associated with the device and stored by another entity. For example, in addition to typical account information, the contactless transaction device 102 may store registration or update information, such as one or more web addresses, an application script for initiating a program on the computing system 104, and the like. In another embodiment, the memory of the contactless transaction device 102 may further be operable to store more personal information, such as name, address, billing information, shipping information, login information, and the like, which may be used to populate an online order or payment form or otherwise provide the information to a merchant when conducting web-based or other network-based transactions, or which may be used as login information to a website or other software application.

Following block 415 is block 420, in which the user's authority to use the contactless transaction device 102 may optionally be verified according to one embodiment. The authority of the user may be verified, such as by requesting and verifying a personal identification number, a password, verification of a public and private key pair, whereby the account number or any other unique number may be used as the public key, and the like, and comparing it to authorization information stored on or associated with the contactless transaction device 102. Verifying the authority of the user may be performed by the computing system 104, by the contactless transaction device 102, by a combination of both, and/or may be performed in association with authorization requests transmitted to a third party, such as a financial institution 110 or a service provider 114 as described with reference to FIGS. 1-3.

In one example embodiment, the level of security may vary depending upon the type of contactless transaction device 102 used. For example, when using an anonymous contactless transaction device 102, such as a gift card or stored value card, lesser authorization functions may be required than when using a contactless transaction device 102 issued by a financial institution and associated with a user's account, such as a credit card or debit card. In one embodiment, when presenting an example anonymous or other minimum security contactless transaction device 102, merely providing the card may satisfy the authorization verification. However, when presenting a more secured contactless transaction device 102, additional authorization information may be requested, such as a personal identification number, a password, verification of a public and private key pair, whereby the account number or any other unique number may be used as the public key, additional authorization information generated by a financial institution or other entity, or additional follow-up security questions. As referenced herein, when performing any authorization function, the level of security and thus authorization verification may range from these minimum levels to more secure levels. Moreover, the security levels may depend on the type of contactless transaction device 102, the transaction or other use for which the device is being presented, for instance a payment as compared to providing login information, the website or other application which is being accessed or to which information is being provided, and the like.

If it is determined that the user is not authorized to use the contactless transaction device 102 at block 420, the contactless transaction application 130 of the computing system 104 may optionally display a status reject message, indicating to the user that the authority verification failed, which may in turn prompt the user to re-enter authorization information and/or re-transmit information from the contactless transaction device 102. However, if it is determined that the user is authorized to use the contactless transaction device 102 at block 420, block 425 follows.

In other embodiments in which the user's authority is not verified, block 420 may not be performed.

Following block 420 is block 425, in which during processing a transaction requesting information, such as the device registration or update transactions or online commerce transactions described above, at least a portion of the information read from the contactless transaction device 102 at block 415 may be automatically populated in the appropriate fields of the web page requesting information or otherwise provided by the contactless transaction application 130 of the computing system 104, as described herein.

For example, in an embodiment in which the contactless transaction device 102 has not been registered, upon reading information from the contactless transaction device 102 in block 415, the computing system 104 may automatically access a device registration website based at least in part on information read from the contactless transaction device 102 and may automatically populate at least part of the information requested by the device registration website. For example, an account number, a pre-defined balance, issuer information, merchant information, and the like, may be read from the contactless transaction device 102 and automatically populated in the associated fields. In another example, such as when updating information associated with the contactless transaction device 102 or when the device registration website is already accessed, the information read from the contactless transaction device 102 in block 415 may be used to populate fields of an already accessed website.

In another example embodiment in which the user is conducting a commercial transaction, for instance, an online commerce transaction, information read from the contactless transaction device 102 in block 415 may be used to populate fields of an online commerce web page and/or information form, such as payment fields, shipping fields, recipient fields, and the like. For example, the user may be conducting an online shopping transaction, and while conducting the payment processing, a web page may request information to complete the transaction, such as an account number, cardholder information, an expiration date, a billing address, shipping address, and the like. Responsive to receiving the request, the user may position the contactless transaction device 102 in proximity to the device reader 106, as in block 415, upon which information read from the contactless transaction device 102 may be used to automatically populate one or more of the fields of the web page. Similarly, when accessing an online website or other software application, and login information is requested, information read from the contactless transaction device 102 in block 415 may include a username and/or a password, or other login information.

In one embodiment, the computing system 104 may perform additional processing of the information read from the contactless transaction device 102 prior to populating or otherwise automatically providing the information as part of the transaction information requested by the website or other application, such as may be performed by the contactless transaction application 130. Additional processing steps may include formatting, parsing, concatenating, and the like.

In another embodiment, the computing system 104 may request additional information from a third party, such as from a service provider or a financial institution, based on information read from the contactless transaction device 102 in block 415. For example, the contactless transaction device 102 may only store one or more unique identifiers, such as an account number or other identifier, that may relate to data stored and maintained by a third party. Upon receiving the one or more unique identifiers, the computing system 104 may request additional remotely stored information from the third party based on the one or more unique identifiers. The request and transmission of remotely stored information may be performed over a network, such as a network 108 as described with reference to FIGS. 1-3. Upon receiving the remotely stored information associated with the one or more unique identifiers, the computing system 104 may populate or otherwise provide at least part of that information as part of the transaction requested by the website or other application in block 425.

Moreover, the user may manually enter some of the transaction information requested, such as that information not automatically populated in block 425.

Following block 425 is block 430, in which the information provided in block 425 is transmitted to the requesting entity, such as by submitting the web page or form to the entity with which the contactless transaction device 102 is being registered or information updated, for instance, a financial institution a service provider, or to a merchant hosting an online commerce website or other online application, depending upon the nature of the transaction.

Following block 430 is block 435, in which at least a portion of the information read from the contactless transaction device 102 in block 415 may be stored in a local memory of the computing system 104. Locally stored information may be used in combination with other embodiments, such as to maintain contactless transaction devices 102 that are authorized to access and use the computing system, to automatically provide transaction information requested when completing online commerce transactions, or to maintain login information, such as usernames and passwords, when accessing one or more websites or other application software. In one embodiment, the information may be stored in a secure memory, limiting access to the information stored.

The method 400 may end after block 435, having automatically provided at least part of transaction information requested based on information read from the contactless transaction device 102.

FIG. 5 is a flowchart of one example method 500 to register or activate a contactless transaction device 102 or to update information associated with a contactless transaction device 102 upon reading information from the contactless transaction device 102 by a computing system.

The method 500 may begin at block 505. At block 505, a computing system in communication with a network, such as a computing system 104 and a network 108 as described with reference to FIGS. 1-3, may be used by a user. The computing system 104 may be any computing system, as described herein, and may further have stored thereon one or more application programs operable for accessing and displaying registration and/or information update websites and operable for automatically populating transaction information requested by such websites, such as an Internet browser application 132 and a contactless transaction application 130, respectively, as described with reference to FIGS. 1-3.

In one example embodiment, the computing system 104 may be used to register or activate a new contactless transaction device 102 after purchase using an online registration website associated with an entity with which the device will be registered. For example, the contactless transaction device 102 may be registered or activated with a financial institution, such as the issuer of the contactless transaction device 102, a service provider, or a merchant. Similarly, in another embodiment, the computing system 104 may be used to update information associated with the contactless transaction device 102 account that is maintained by the entity, such as to update cardholder preferences, address information, loyalty information, and the like.

Following block 505 is block 510, in which a contactless transaction device reader, such as a contactless transaction device reader 106 as described with reference to FIGS. 1-3, may request or otherwise receive information from a contactless transaction device 102. The contactless transaction device 102 includes a memory operable to store various information, such as may be typically used to process commercial transactions. In one embodiment, however, the memory of the contactless transaction device 102 may further be operable to store additional information that may be used to facilitate registering the device and/or updating information associated with the device. For example, in addition to typical account information, the contactless transaction device 102 may store registration or update information, such as one or more web addresses or an application script for initiating a program on the computing system 104.

Following block 510 is decision block 515, in which it may be determined if the contactless transaction device 102 has been registered with the appropriate entity. The determination may be made based at least in part by the contactless transaction application 130. An indicator may be stored locally in memory of the computing system 104, such as a cookie or in a cache. In another embodiment, an indicator may be maintained in the contactless transaction device 102, such that upon registration, a binary value or other status indicator is changed in the memory of the contactless transaction device 102. In yet another embodiment, the computing system 104 may communicate with a third party, such as the entity with which the contactless transaction device 102 is to be registered, to determine whether the contactless transaction device 102 has in fact been registered.

It is appreciated that in other embodiments, the determination at decision block 515 does not need to be made, such as when the same or similar website or other application for updating information may be accessed to register the contactless transaction device 102.

If it is determined at decision block 515 that the contactless transaction device 102 has not been registered with the entity, blocks 520 through 540 follow to facilitate registration. If it is determined that the contactless transaction device 102 has been registered, blocks 545 through 565 may follow to facilitate updating information associated with the contactless transaction device 102 if desired. However, it is appreciated that neither the registration nor the update processing must be performed each time the contactless transaction device 102 is read by the contactless transaction device reader 106. For example, if the card is already registered, the user may indicate that they do not want to update information. Or in another example, the contactless transaction application 130 programming may be adapted to only provide the update and/or registration processing if expressly requested or otherwise indicated by the user.

Upon determining that the contactless transaction device 102 has not been registered at decision block 515, block 520 follows, in which an online registration website or other application is accessed to facilitate registering the contactless transaction device 102 with the appropriate entity. For example, contactless transaction devices 102 may be registered and/or have information maintained by a financial institution, such as the issuer of the transaction device or any other financial institution, by a third party service provider performing services for the issuer, or by a merchant as may be done when the merchant maintains information associated with the devices, such as when implementing an incentive (e.g., loyalty or rewards) or other customer behavior focused program. According to one embodiment, the website may be automatically accessed, based on information read from the contactless transaction device 102 in block 510. For example, the contactless transaction device 102 may have one or more web addresses stored in memory, which, when read by contactless transaction device reader 106 of the computing system 104, may allow the contactless transaction application 130 to automatically access the website via the Internet browser application 132 over the Internet or other network.

Following block 520 is block 525, in which at least a portion of the information read from the contactless transaction device 102 in block 510 may be automatically populated in the appropriate fields of the web page or form requesting device registration information as described herein. For example, an account number, a pre-defined balance, issuer information, or merchant information may be read from the contactless transaction device 102 and automatically populated in the associated fields.

Following block 525 is block 530, in which the user may manually input additional information into the registration information requested by the registration website or other application. For example, some requested information may not be automatically populated from information read from the contactless transaction device 102, such as when selecting a new personal identification number, or updating cardholder name information, cardholder address information, cardholder phone numbers, cardholder preferences, and the like.

Following block 530 is block 535, in which the information automatically provided in block 525 and manually entered by the user in block 530 is transmitted to the entity for registering the contactless transaction device 102. The information may be transmitted by submitting the registration web page over the Internet.

Following block 535 is block 540, in which the contactless transaction application 130 may optionally store at least a portion of the information read from the device in block 510 and/or manually input by the user in block 530 in a local memory of the computing system 104. Information stored locally may be used in combination with other embodiments, such as to maintain contactless transaction devices 102 that are authorized to access and use the computing system, or to automatically provide transaction information requested when completing online commerce transactions.

In another embodiment, the contactless transaction application 130 may not transmit information read from the contactless transaction device 102 to an entity at all in block 535, but may only store the information in local memory on the computing system 104.

Following block 540, the method 500 may end, having registered the contactless transaction device 102 based at least in part on information read from the contactless transaction device 102.

However, if at decision block 515 it is determined that the device has been registered with the appropriate entity, blocks 545 through 550 follow, in which the information associated with the contactless transaction device may be updated in a manner similar to that described for blocks 520 through 540. At block 545, after determining that the contactless transaction device 102 has been registered, an online update website or other application is accessed to facilitate updating information associated with the contactless transaction device 102 and maintained by the appropriate entity. According to one embodiment, the website may be automatically accessed, based on information read from the contactless transaction device 102 in block 510.

Following block 545 is block 550, in which at least a portion of the information read from the contactless transaction device 102 in block 510 may be automatically populated in the appropriate fields of the web page or form requesting device update information as described herein. For example, similar to the registration steps, an account number, a pre-defined balance, issuer information, or merchant information may be read from the contactless transaction device 102 and automatically populated in the associated fields to accurately and efficiently identify the contactless transaction device 102.

Following block 550 is block 555, in which the user can manually input the information to be updated into the information update webpage or form. The user may want to update cardholder information, such as a change of address, cardholder preferences, or process a personal identification number change request, for example.

Following block 555 is block 560, in which the information automatically provided in block 550 and the information updated in block 555 may be optionally transmitted to the entity to complete the update processing, such as by submitting the registration web page over the Internet.

Following block 560 is block 565, in which the contactless transaction application 130 may optionally store at least a portion of the updated information input by the user in block 555 in a local memory of the computing system 104. Locally stored information may be used in combination with other embodiments, such as to maintain contactless transaction devices 102 that are authorized to access and use the computing system, or to automatically provide transaction information requested when completing online commerce transactions.

In another embodiment, the contactless transaction application 130 may not transmit information read from the contactless transaction device 102 to an entity for registration at block 535, but may only store the information in local memory on the computing system 104.

In yet another embodiment, the contactless transaction application 130 may transmit information entered or updated, such as at block 555, to the contactless transaction device 102 via the contactless transaction device reader 106. This may be done when updating billing, shipping, or other user information that may optionally be stored on the contactless transaction device 102, or when the contactless transaction device 102 is used to maintain website or other software application login information, such as application identifiers, user names, and passwords.

Following block 565, the method 500 may end, having updated information associated with the contactless transaction device 102 based at least in part on information read from the contactless transaction device 102 and by updated information input by the user, whether it be transmitted to an entity maintaining the information or stored locally.

FIG. 6 is a flowchart of one example method 600 for facilitating a commercial transaction using information stored on a contactless transaction device 102. A contactless transaction application program executed by a computing system may allow for automatically providing transaction information requested by a web page or other online application when conducting an online transaction with a merchant, such as an online purchase or payment transaction.

The method 600 may begin at block 605. At block 605, a computing system in communication with a network, such as a computing system 104 and a network 108 as described with reference to FIGS. 1-3, may be used by a user. The computing system 104 may be any computing system, as described herein, and may further have stored thereon one or more application programs operable for accessing and displaying online applications for performing commercial transactions and operable for automatically populating transaction information, such as an Internet browser application 132 and a contactless transaction application 130, respectively, as described with reference to FIGS. 1-3.

Following block 605 is block 610, in which the computing system 104 may be used to access a web-based commerce application hosted by or on behalf of a merchant, such as may be used to conduct an online purchase transaction or online payment, for example. In this example, the user may access the website, conduct their shopping or payment processing, and navigate to one or more payment web pages or forms, or one or more information web pages or forms. For example, the web page or other application may request commercial transaction information as may be typically requested by online commerce applications. In another example, the web page (or another software application) may request login information, such as a username and/or password.

In example embodiments, websites or other software applications may be pre-selected or pre-authorized participants to allow providing transaction or login information from a contactless transaction device. In these embodiments, the contactless transaction application 130 may include programming to identify these pre-selected participants and automatically prompt the user to present the contactless transaction device 102 when necessary. However, in other embodiments, a pre-selected website may present alternative pages or forms for users wishing to provide transaction or login information from a contactless transaction device 102. Moreover, in some embodiments, websites may not need to be pre-selected participants, and the contactless transaction application 130 may be operable to prompt or otherwise instruct a user to optionally scan a contactless transaction device at any time transaction or login information is requested.

Following block 610 is block 615, in which a contactless transaction device reader 106 in communication with the computing system 104 may read information from the contactless transaction device 102 to facilitate entering the commercial transaction information requested.

In one embodiment, the memory of the contactless transaction device 102 may store at least some of commercial transaction information requested, such as an account number, and in some embodiments, a balance, a spending limit, or an expiration date. In yet another example embodiment, the memory of the contactless transaction device 102 may further be operable to store cardholder information, such as name, shipping address, billing address, website or software application login information, and the like, which may also be elements of the commercial transaction information (or other transaction) requested.

In another embodiment, the contactless transaction device 102 may store one or more unique identifiers, such as an account number or other identifier, that may relate to data stored and maintained by a third party. Upon receiving the one or more unique identifiers, the computing system 104 may request additional remotely stored information from the third party based on the one or more unique identifiers. The request and transmission of remotely stored information may be performed over a network, such as a network 108 as described with reference to FIGS. 1-3. The remotely stored information associated with the one or more unique identifiers may also include at least some of the commercial transaction information requested.

Following block 615 is block 620, in which the user's authority to use the contactless transaction device 102 may optionally be verified according to one embodiment. The authority of the user may be verified, such as by requesting and verifying a personal identification number, a password, verification of a public and private key pair, whereby the account number or any other unique number may be used as the public key, and the like, and comparing it to authorization information stored on or associated with the contactless transaction device 102. Verifying the authority of the user may be performed by the computing system 104, by the contactless transaction device 102, by a combination of both, and/or may be performed in association with authorization requests transmitted to a third party, such as a financial institution 110 or a service provider 114 as described with reference to FIGS. 1-3.

If it is determined that the user is not authorized to use the contactless transaction device 102 at block 620, the contactless transaction application 130 of the computing system 104 may optionally display a status reject message, indicating to the user that the authority verification failed, which may in turn prompt the user to re-enter authorization information, and/or re-transmit information from the contactless transaction device 102. However, if it is determined that the user is authorized to use the contactless transaction device 102 at block 620, block 625 follows.

At block 625 the information read from the contactless transaction device 102 in block 615 may be used to populate fields of the web page or other application requesting commercial transaction information, such as name, account number, expiration date, billing address, shipping address, or login information.

In an embodiment in which the information read from the contactless transaction device 102 includes login information, after providing it at block 625, the website or other application may continue with typical processing, such as navigating to shopping forms, payment forms, or providing user-specific content (e.g., a user-customized web portal providing news, financial, places of interest, and other information personalized to the user upon verifying the user's identity).

In one embodiment, the computing system 104 may perform additional processing of the information read from the contactless transaction device 102 prior to populating or otherwise providing the commercial transaction information requested. Additional processing steps may include formatting, parsing, concatenating, and the like.

Following block 625 is block 630, in which the user may optionally input additional commercial transaction information requested by the web page or other application. For example, information may not be provided at all by the contactless transaction device 102 or may be different than that provided automatically, such as address information, shipping preferences, discount information, and the like.

Following block 630 is block 635, in which the computing system 104 may optionally retrieve transaction detail information from the web page or other application, such as merchant information, price information, product information, order date information, expected shipping date information, and the like. This information may be stored in a local memory of the computing system 104, for subsequent use, such as transmittal to another entity, or for reporting and tracking transactions and device activity.

Following block 635 is block 640, in which the information automatically provided in block 625 and the information manually input by the user in block 630 may be transmitted to the merchant to complete the commercial transaction, such as by submitting the web page over the Internet to the merchant.

In one embodiment, the merchant may optionally transmit a status message in response to the transmittal in block 640, indicating whether the commercial transaction was successful. Upon receiving the status message, the computing system 104 may optionally store the status or an indication thereof in a local memory for subsequent use.

Following block 640 is block 645, in which the computing system 104 may optionally transmit some or all of the commercial transaction information transmitted in block 640 and/or the transaction detail information retrieved in block 635 to another entity, such as a financial institution. The transaction information may be transmitted to the financial institution to give the financial institution advanced notice of the transaction, or to confirm the transaction to help identify fraudulent transactions, for example. Moreover, using the contactless transaction device 102 when conducting an online transaction may give the device user certain advantages, such as incentives created by the financial institution and/or the merchants, and transmitting 330 the transaction information may aid in tracking those uses as well as allow those entities to track valuable information associated with consumer behaviors.

The method 600 may end after block 645, after commercial transaction information is automatically provided based at least in part on information read from a contactless transaction device 102 when presented to a contactless transaction device reader 106 of a computing system 104 while conducting an online transaction.

FIG. 7 is a flowchart of one example method 700 for controlling access to a computing system using information stored on a contactless transaction device 102. A contactless transaction application program executed by a computing system may allow for controlling a user's access to the computing system by reading information from a contactless transaction device 102 and confirming that the contactless transaction device 102 indicates authorization to access the computing system and that the user is authorized to use the contactless transaction device 102.

The method 700 may begin at block 705. In block 705 a user wishing to access a computing system in communication with a contactless transaction device reader 106, such as a computing system 104 and contactless transaction device reader 106 as described with reference to FIGS. 1-3, may place a contactless transaction device 102 in proximity to the contactless transaction device reader 106. The computing system 104 may be any computing system, as described herein, and may further have stored thereon one or more application programs operable for controlling access to the computer system based at least in part on information read using a contactless transaction device reader 106, such as a contactless transaction application 130 as described with reference to FIGS. 1-3.

Following block 705 is block 710, in which the contactless transaction device reader 106 may read information from the contactless transaction device 102 to begin the verification process of the user's authority to access the computing system 104. The information read from the contactless transaction device 102 may include authorization information, such as a personal identification number or a password. The information read may also include information typically stored on the contactless transaction device 102, such as an account number.

Following block 710 is block 715, in which the contactless transaction application 130 may request user authorization input to be entered by the user, to verify that user's authority to use the contactless transaction device 102 and/or to verify the user's authority to access the computing system 104. User authorization input may include, but is not limited to, a personal identification number, a password, a biometric identifier, a private key known only to the user, and the like.

Following block 715 is decision block 720, in which the authority of the user to use the contactless transaction device 102 is determined. For example, the contactless transaction application 130 may compare the user authorization input entered in block 715 with the authorization information read from the contactless transaction device 102 in block 710. In another embodiment, at least some of the verification may be performed by the microchip of the contactless transaction device 102, whereby the user authorization input is transmitted to the contactless transaction device 102 via the contactless transaction device reader 106 for comparison, and the resulting response is returned to the contactless transaction application 130.

If it is determined at decision block 720 that the user is not authorized to use the contactless transaction device 102, block 725 follows, in which the user is prevented from accessing the computing system 104. The contactless transaction application 130 of the computing system 104 may optionally display a status reject message, indicating to the user that the authority verification failed, which may in turn prompt the user to re-enter authorization information, and/or re-transmit information from the device.

However, if it is determined that the user is authorized to use the contactless transaction device 102 at block 720, decision block 730 follows. At decision block 730, it is determined whether the contactless transaction device 102 is associated with and thus given permission to access the computing system 104. For example, the contactless transaction application 130 may compare some or all of the information read in block 710 to information stored in a local memory of the computing system 104 that identifies which contactless transaction devices 102 have been given permission to access the computing system 104. The information may be originally stored in the memory of the computing system during registration processing of one or more contactless transaction devices 102, such as is described with reference to FIG. 5. In another embodiment, the information may be entered independent of the registration processing. The determination at decision block 730 may be done by comparing an account number or other unique identifier associated with the contactless transaction device 102 to information stored in memory, or by comparing the authorization information, such as a personal identification number or password associated with the contactless transaction device 102, to information stored in memory.

If it is determined at decision block 730 that the contactless transaction device 102 is not associated with and thus not authorized access to the computing system 104, block 725 follows, in which the user is prevented from accessing the computing system 104. The contactless transaction application 130 of the computing system 104 may optionally display a status reject message, indicating to the user that the authority verification failed, which may in turn prompt the user to re-enter authorization information, and/or re-transmit information from the device.

However, if it is determined at decision block 730 that the contactless transaction device 102 is associated with and thus authorized access to the computing system 104, block 735 follows, in which the user is given access to the computing system 104.

In one embodiment, the computing system 104 may transmit some or all authorization information to a service provider via a network to aid in verifying the user's authority to use the contactless transaction device 102 and/or the authority of the contactless transaction device 102 to permit access to the computing system 104. In response, the service provider may respond to the computing system 104 via the network with a status message, such as an approval or denial. In other embodiments, however, the computing system 104 may simply receive information from the service provider 114 and perform the verification locally based at least in part on that information.

The access control processing illustrated by this method 700 may be used instead of or in addition to normal login processing that may otherwise be performed by the computing system 104.

In other embodiments, the method 700 may not require the user to provide additional user authorization input, such as at block 715, and the determination made at decision block 720 may not be processed. For instance, simply providing a contactless transaction device 102, such as is performed at block 705, and verifying that the contactless transaction device 102 is associated with the computing system 104, such as is performed at block 730, may be all that is required to control access to the computing system 104.

Moreover, the level of control required when controlling access to a computing system 104 may be programmable by the user, such that under some instances, additional security (e.g., user authorization input or additional security input, such as security questions) may be required. Various levels of control may be stored in or associated with one or more security profiles, which may be updatable by the user. For example, each contactless transaction device 102 may have a security profile associated with it that provides the required control mechanisms. The security profiles may also vary based on other factors, such as time of day, day of week, date, and the like. The security profiles may also have mechanisms to vary the level of access to the computing system 104, such that certain contactless transaction devices 102 can access a first group of computing functions (e.g., software applications, websites, read/write permissions, etc.), while only other contactless transaction devices can access a second group (or any other number of groups) of computing functions. This feature may be useful to provide administrative access and/or to control access to certain data files or software applications, while restricting access to others, such as to restrict a child's login.

The method 700 may end after block 735 or block 725, having approved or denied the user's authority to access the computing system 104 based on information read from the contactless transaction device 102.

FIG. 8 is a flowchart of one example method 800 for verifying a user's identity to control access to a website or other software application using information stored on or associated with a contactless transaction device 102. Upon registering a contactless transaction device 102 with a financial institution, such as the financial institution 110 described with reference to FIGS. 1-3, or any other entity, such as a service provider, unique authorization information may be generated by the financial institution 110 and associated with the contactless transaction device 102 that may allow additional parties to verify the identity of the user when the device is presented. Such a verification of user identity by the financial institution 110 may aid in controlling or otherwise facilitating access to one or more websites even when no commercial transaction or other financial transaction using the contactless transaction device 102 as a payment instrument occurs.

The method 800 may begin at block 805. In block 805 a user wishing to access a website from a computing system in communication with a contactless transaction device reader 106, such as a computing system 104 and contactless transaction device reader 106 as described with reference to FIGS. 1-3, may place a contactless transaction device 102 in proximity to the contactless transaction device reader 106. The computing system 104 may be any computing system, as described herein, and may further have stored thereon one or more application programs operable for providing user information, login information, and other identification verification information based at least in part on information read using a contactless transaction device reader 106, such as a contactless transaction application 130 as described with reference to FIGS. 1-3.

The contactless transaction device 102 may be a payment device that is registered with a financial institution 110, such as the issuer, or with a service provider in another embodiment. In doing so, the financial institution 110 may generate additional authorization information, such as an authorization "token" or other data element that is uniquely associated with the contactless transaction device and only known by limited parties. For example, the additional authorization information generated by the financial institution 110 may be, but is not limited to, a password, a unique key, an answer to a security question, a unique image, and the like. The financial institution 110 may communicate this to the user during the registration process such that the user needs to remember or otherwise store the additional authorization information, or may communicate it to the registering computing system 104, such that it is stored in memory, whether it be "known" or not by the user. Because the financial institution 110 generated the additional authorization information, the financial institution 110 may serve as an additional layer of user identity verification, verifying the contactless transaction device 102 information and any additional authorization information that is associated therewith.

Upon navigating to a website requesting user identification, such as a username and password, a contactless transaction device reader 106 may read information from a contactless transaction device 102. The information read is to be provided over a network to the entity hosting the website, such as a merchant or other content provider. In one embodiment, information read from the contactless transaction device 102 may include an account number, and may be used at least in part by the website and/or the financial institution 110 to verify the user's identity. In other embodiments, the information read from the contactless transaction device 102 may include, but is not limited to, a username, a card number, or any other unique identifier.

In addition to reading information from the contactless transaction device 102, additional verification information may be provided to the website, according to one embodiment. The additional verification information may include that provided by the financial institution 110 upon registering the device, as described above. Though, in other embodiments other verification information may be provided, such as a password, personal identification number, and the like. In one embodiment, the user manually enters the additional verification information into a website form, or alternatively into a form presented by the contactless transaction application 130. In another embodiment, the additional verification information may be provided automatically when reading the user information from the contactless transaction device 102.

Following block 805 is block 810, in which the information read from the contactless transaction device 102, and optionally any additional verification information, is transmitted over a network to the website for verifying the identity of the user.

Following block 810 is block 815, in which the website may transmit the received information to the financial institution 110 or other entity to verify the identify of the user. For example, the website host may transmit the user information read from the contactless transaction device 102, such as an account number or other unique identifier, and the additional verification information, such as an authorization token generated by the financial institution 110, to determine if the user is so authorized to use the contactless transaction device 102.

Following block 815 is block 820, in which the website may receive a response from the financial institution 110 to verify the identity of the user. As described, the financial institution 110, or any other entity operable to store authorization information associated with a contactless transaction device 102, may confirm proper use of the contactless transaction device 102 and/or the identity of the user based on the authorization information generated. If the additional authorization information transmitted from the computing system 104 to the website host and ultimately to the financial institution 110 is the same as that generated for the contactless transaction device 102 for which user information is received, then the financial institution 110 may confirm proper use of the contactless transaction device, such as by transmitting an approval status to the website host. According to one example, the financial institution 110 may also optionally transmit user identifying information, such as login information, name, account number, and the like. Otherwise, if the additional authorization information received by the financial institution 110 is not the same as that generated for the contactless transaction device 102 for which user information is received, then the financial institution 110 may transmit a denial status to the website host.

In one embodiment, only user information read from the contactless transaction device 102, such as an account number, is transmitted in block 815 and verified in block 820. In this example, the financial institution 110 simply confirms the identity of the cardholder and transmits such identity and/or other verification status message to the website host. The website host may compare the identity of the cardholder as confirmed by the financial institution 110 against the account attempting to be accessed by the user, denying access upon any mismatch or discrepancy in cardholder and website account information.

Following block 820 is decision block 825, in which the website host may determine whether the financial institution 110 or other entity verified the identity of the user based on the transmission received in block 820. At decision block 825, if the financial institution 110 did not verify the user, then block 830 follows, in which the website may prevent access to the website. The website and/or the contactless transaction application 130 of the computing system 104 may optionally display a status reject message, indicating to the user that the authority verification failed, which may in turn prompt the user to re-enter authorization information, and/or re-transmit information from the device.

However, if it is determined at decision block 825 that the financial institution did verify the identity of the user, block 835 follows, in which the user is given access to the website.

Following block 835 is optional block 840, in which the website host may transmit or otherwise display additional verification information to the user to indicate the validity of the website, as may be confirmed by the financial institution 110 in a manner similar to that which occurs in block 815 and 820. For example, the website host may request authorization from the financial institution 110, such that the financial institution 110 may transmit a verification to the website host which is displayed to the consumer. The financial institution 110 may maintain standards for website verification, causing the website hosts to adhere to such standards before allowing a user to use a contactless transaction device 102 with the website as described herein. In one example embodiment, the financial institution 110 may not confirm the identity of the user in block 820 if the website is not also authorized by the financial institution 110, though a different rejection message for transmission to the user may be generated indicating the reasons for rejection. In another embodiment, the merchant authorization by the financial institution 110 may be optional such that the user may select to proceed without such authorization or when a failed indication is displayed to the user.

The method 800 may end after block 830 or block 840, having approved or denied the user's authority to access the website based on information read from the contactless transaction device 102 and optionally generated by the financial institution.

The operations described and shown in the methods of FIGS. 3-8 may be carried out or performed in any suitable order as desired in various embodiments of the invention. Additionally, in certain embodiments, at least a portion of the operations may be carried out in parallel. Furthermore, in certain embodiments, less than or more than the operations described in FIGS. 3-8 may be performed.

The invention is described above with reference to block diagrams and flowchart illustrations of systems, methods, apparatuses and computer program products according to embodiments of the invention. It will be understood that each block of the block diagrams, and combinations of blocks in the block diagrams, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functionality of each block of the block diagrams, or combinations of blocks in the block diagrams discussed in detail in the descriptions above.

These computer program instructions may also be stored in a computer readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the block or blocks.

Accordingly, blocks of the block diagrams and flowchart illustrations support combinations of means for performing the specified functions, combinations of elements or steps for performing the specified functions and program instruction means for performing the specified functions. It will also be understood that each block of the block diagrams, and combinations of blocks in the block diagrams, can be implemented by special purpose hardware-based computer systems that perform the specified functions, elements or steps, or combinations of special purpose hardware and computer instructions.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. A system, comprising:
a communications interface operable to connect with a network;
a memory device comprising instructions for conducting transactions;
a contactless transaction device reader operable to communicate wireles sly with a contactless transaction device comprising a RFID communications enabled payment card, the contactless transaction device reader further operable to energize inductively the contactless transaction device via a wireless signal in response to the contactless transaction device being positioned at a defined distance from the contactless transaction device reader; and
a processor in communication with the memory device, the communications interface, and functionally coupled to the contactless transaction device reader, the processor operable to execute the instructions to:
facilitate presentation of a web page via the network, the web page presented on a display screen of a computing system;
cause the contactless transaction device reader to energize the contactless transaction device to transmit user information and to receive the user information from the energized contactless transaction device;
verify, via communication with a third party entity over a network, that a user associated with the user information is authorized to use the contactless transaction device with the web page, wherein the instructions to verify that the user is authorized comprise instructions to use the user information and further comprise additional verification information from the third party entity, wherein the additional verification information from the third party entity is based at least in part on an authorization token generated by or on behalf of the third party entity or received from the third party entity, the additional verification information stored on a microchip of the contactless transaction device;

based on a first type of contactless transaction device used by the user, the first type of contactless transaction device comprising a gift card or a stored value card, request less user information and less additional verification information than for when the user uses a different type of contactless transaction device comprising a credit card or a debit card, wherein when the user uses the different type of contactless transaction device, request more user information and additional verification information than when using the first type of contactless transaction device;

confirm the additional verification information to authenticate the user's identity;

determine a registration status of the contactless transaction device;

in response to determining the registration status, automatically populate at least part of information requested by the web page based at least in part on registration information from the contactless transaction device;

automatically provide transaction information for facilitating a transaction via the web page, based at least in part on the user information, when conducting the transaction via the network; and encrypt and transmit at least a portion of the transaction information to an entity via the communications interface via the network, wherein the portion of the transaction information is used to facilitate the transaction via the web page.

2. The system of claim 1, wherein the contactless transaction device reader is integrated with a personal computing system.

3. The system of claim 1, wherein the contactless transaction device reader comprises a peripheral device in communication with a personal computing system.

4. The system of claim 1, wherein the contactless transaction device further comprises a body, an antenna, and a microchip in communication with the antenna, the microchip operable to communicate with the contactless transaction device reader using a radio-frequency protocol.

5. The system of claim 1, wherein the information comprises at least one of: name information, address information, billing information, shipping information, account information, user preference information, authorization information, or registration information.

6. The system of claim 1, wherein the transaction comprises a web-based contactless device registration transaction, and wherein the information from the contactless transaction device comprises registration information to facilitate registering the contactless transaction device with at least one entity, and further wherein the processor is further operable to execute the instructions to:

automatically provide the transaction information, based at least in part on the registration information from the contactless transaction device, when conducting the contactless device registration transaction via the network; and transmit at least a portion of the registration information to the at least one entity via the network.

7. The system of claim 6, wherein the registration information comprises a web address associated with the entity for conducting the contactless transaction device registration transaction, and wherein the processor is further operable to execute the instructions to automatically request the web address via the communications interface via the network.

8. The system of claim 1, wherein the transaction comprises a web-based commercial transaction with a merchant device, and wherein the information from the contactless transaction device comprises at least one of account information, name information, billing information, or shipping information, and further wherein the processor is further operable to execute the instructions to:

automatically provide the transaction information, based at least in part on the information from the contactless transaction device, when conducting the commercial transaction via the network; and transmit at least a portion of the transaction information to the merchant device via the network.

9. The system of claim 8, wherein the information comprises account information, and wherein the processor is further operable to execute the instructions to transmit at least one message to a financial institution device associated with the account information, the message notifying the financial institution of the commercial transaction.

10. The system of claim 9, wherein the processor is further operable to execute the instructions to transmit second transaction information associated with the commercial transaction to the financial institution, wherein the second transaction information comprises at least one of merchant information, price information, product information, or date information confirmation information.

11. A method, comprising:

facilitating presentation of a web page via a network, the web page presented on a display screen of a computing system;

providing a contactless transaction device reader in communication with the personal computing system via a network;

activating wirelessly a contactless transaction device, the contactless transaction device comprising a RFID communications enabled payment card comprising at least one of a credit card, a debit card, or a stored value card, in proximity to the contactless transaction device reader to transmit registration information and transaction information including user information;

receiving the registration information and the transaction information from the contactless transaction device in response to the activating;

verifying, by the personal computing system via communication with a third party entity over the network, that a user associated with the user information is authorized to use the contactless transaction device with the web page, the verifying that the user is authorized comprising using the user information from the contactless transaction device and further comprising additional verification information from the third party entity, wherein the additional verification information from the third party entity is based at least in part on an authorization token generated by or on behalf of the third party entity or received from the third party entity, the additional verification information stored on a microchip of the contactless transaction device;

based on a first type of contactless transaction device used by the user, the first type of contactless transaction device comprising a gift card or a stored value card, requesting less user information and additional verification information than for when the user uses a different type of contactless transaction device comprising a credit card or a debit card, wherein when the user uses the different type of contactless transaction device, requesting more user information and additional verification information than when using the first type of contactless transaction device;

confirming additional authorization information to authenticate the user's identity;

determining, by the computing system, a registration status of the contactless transaction device;

in response to determining the registration status, automatically populate at least part of the information requested by the web page based at least in part on the registration information from the contactless transaction device;

automatically providing, by the personal computing system, at a least a portion of transaction information for facilitating a transaction via the web page, based at least in part on the information from the contactless transaction device, when conducting the transaction via the network; and encrypting and transmitting at least a portion of the transaction information from the personal computing system to an entity via the network, wherein the portion of the transaction information is used to facilitate the transaction via the web page.

12. The method of claim 11, wherein receiving the transaction information from the contactless transaction device comprises receiving at least one of name information, address information, billing information, shipping information, account information, user preference information, or authorization information.

13. The method of claim 11, wherein the contactless transaction device reader is operable to communicate with the contactless transaction device according to at least one standard ISO 14443, ISO 18092, or ISO 15693, the contactless transaction device comprising a body, an antenna, and a microchip in communication with the antenna.

14. The method of claim 11, wherein:
the transaction comprises a web-based contactless device registration transaction;
receiving the registration information from the contactless transaction device comprises receiving information to facilitate registering the contactless transaction device with at least one entity;
automatically providing at least the portion of the transaction information comprises automatically providing at least the portion of the transaction information, based at least in part on the registration information from the contactless transaction device, when conducting a contactless device registration transaction via the network; and
transmitting at least the portion of the transaction information comprises transmitting at least the portion of the registration information from the personal computing system to the at least one entity via the network.

15. The method of claim 14, wherein the registration information comprises a web address associated with the entity for conducting the contactless device registration transaction, and further comprising automatically requesting the web address via the network by the personal computing system.

16. The method of claim 11, wherein:
the transaction comprises a web-based commercial transaction with a merchant device;
receiving the transaction information from the contactless transaction device comprises receiving account information;
automatically providing at least the portion of the transaction information comprises automatically providing at least the portion of the transaction information, based at least in part on the account information from the contactless transaction device, when conducting the commercial transaction via the network; and
transmitting at least the portion of the transaction information comprises transmitting at least the portion of the account information from the personal computing system to the merchant device via the network.

17. The method of claim 16, further comprising transmitting at least one message to a financial institution device associated with the account information, the message notifying the financial institution device of the commercial transaction.

18. The method of claim 17, further comprising transmitting transaction detail information associated with the commercial transaction to the financial institution device, wherein the transaction detail information comprises at least one of merchant information, price information, product information, or date information confirmation information.

19. The method of claim 11, wherein:
the transaction comprises a web-based commercial transaction with a merchant device;
receiving the transaction information from the contactless transaction device comprises receiving at least one of name information, billing information, or shipping information;
automatically providing at least the portion of the transaction information comprises automatically providing at least the portion of the transaction information, based at least in part on the at least one of name information, billing information, or shipping information from the contactless transaction device, when conducting the commercial transaction via the network; and
transmitting at least the portion of the transaction information comprises transmitting at least a portion of the at least one of name information, billing information, or shipping information from the personal computing system to the merchant device via the network.

20. The method of claim 11, wherein transmitting at least the portion of the transaction information comprises transmitting information from the contactless transaction device and additional authorization information to the entity, and wherein at least one of the user information from the contactless transaction device or the additional authorization information is used by the entity to confirm the authority of the user of the contactless transaction device.

21. A method, comprising:
providing a computing system;
providing a contactless transaction device reader in communication with the computing system and operable to communicate with a contactless transaction device, the contactless transaction device comprising a RFID communications enabled payment card comprising at least one of a credit card, a debit card, or a stored value card, the contactless transaction device reader further operable to energize inductively the contactless transaction device via a wireless signal in response to the contactless transaction device being positioned at a defined distance from the contactless transaction device reader; and controlling access to the computing system upon:

facilitating presentation of a web page via a network, the web page presented on a display screen of a computing system;

energizing wirelessly the contactless transaction device via the contactless transaction reader to transmit registration information and transaction information including user information;

receiving the registration information and the transaction information from the contactless transaction device;

receiving authorization input with the web page, the receiving the authorization input comprises using the user information from the contactless transaction device and further comprises additional verification information from a third party entity, wherein the additional verification information from the third party entity is based at least in part on an authorization token generated by or on behalf of the third party entity or received from the third party entity, the additional verification information stored on a microchip of the contactless transaction device;

based on a first type of contactless transaction device used by the user, the first type of contactless transaction device comprising a gift card or a stored value card, requesting less user information and additional verification information than for when the user uses a different type of contactless transaction device comprising a credit card or a debit card, wherein when the user uses the different type of contactless transaction device, requesting more user information and additional verification information than when using the first type of contactless transaction device;

confirming the additional authorization information to authenticate the user's identity;

determining that the authorization input is associated with the information from the contactless transaction device;

determining that the information from the contactless transaction device is associated with the computing system;

determining a registration status of the contactless transaction device;

in response to determining the registration status, automatically populate at least part of the information requested by the web page based at least in part on the registration information from the contactless transaction device; and encrypting and automatically providing transaction information for facilitating a transaction via the web page, based at least in part on the information from the contactless transaction device, when conducting the transaction.

22. The method of claim 21, wherein receiving the authorization input comprises receiving at least one of a personal identification number, a password, or a biometric identifier.

23. The method of claim 21, wherein determining that the authorization input is associated with the transaction information from the contactless transaction device further comprises:

transmitting the transaction information from the contactless transaction device and the authorization input to an entity via a network; and receiving confirmation that the authorization input is associated with the contactless transaction device from the entity via the network.

\* \* \* \* \*